(12) United States Patent
White et al.

(10) Patent No.: US 8,498,872 B2
(45) Date of Patent: Jul. 30, 2013

(54) FILTERING TRANSCRIPTIONS OF UTTERANCES

(75) Inventors: Marc White, Charlotte, NC (US); Cliff Strohofer, Charlotte, NC (US)

(73) Assignee: Canyon IP Holdings LLC, Wilmington, DE (US)

(*) Notice: Subject to any disclaimer, the term of this patent is extended or adjusted under 35 U.S.C. 154(b) by 0 days.

(21) Appl. No.: 13/621,194

(22) Filed: Sep. 15, 2012

(65) Prior Publication Data

US 2013/0018656 A1 Jan. 17, 2013

Related U.S. Application Data

(63) Continuation of application No. 12/614,571, filed on Nov. 9, 2009, which is a continuation of application No. 12/198,112, filed on Aug. 25, 2008, now abandoned, which is a continuation-in-part of application No. 11/697,074, filed on Apr. 5, 2007, now Pat. No. 8,117,268.

(60) Provisional application No. 60/789,837, filed on Apr. 5, 2006, provisional application No. 60/957,706, filed on Aug. 23, 2007, provisional application No. 60/972,851, filed on Sep. 17, 2007, provisional application No. 60/972,936, filed on Sep. 17, 2007, provisional application No. 61/021,335, filed on Jan. 16, 2008, provisional application No. 61/038,046, filed on Mar. 19, 2008, provisional application No. 61/041,219, filed on Mar. 31, 2008.

(51) Int. Cl.
*G10L 15/30* (2013.01)

(52) U.S. Cl.
USPC .................................. 704/270.1; 455/412.1

(58) Field of Classification Search
USPC .................................. 704/270.1; 455/412.1
See application file for complete search history.

(56) References Cited

U.S. PATENT DOCUMENTS

| 5,675,507 | A | 10/1997 | Bobo, II |
| 5,974,413 | A | 10/1999 | Beauregard et al. |
| 6,173,259 | B1 | 1/2001 | Bijl et al. |
| 6,219,407 | B1 | 4/2001 | Kanevsky et al. |
| 6,219,638 | B1 | 4/2001 | Padmanabhan et al. |
| 6,298,326 | B1 | 10/2001 | Feller |
| 6,490,561 | B1 | 12/2002 | Wilson et al. |

(Continued)

FOREIGN PATENT DOCUMENTS

| EP | 127422 A2 | 1/2003 |
| WO | 2006101528 A1 | 9/2006 |

OTHER PUBLICATIONS

Bisani, M., et al., Automatic editing in a back-end speech-to-text system, 2008, 7 pages.

(Continued)

*Primary Examiner* — Susan McFadden
(74) *Attorney, Agent, or Firm* — Knobbe, Martens, Olson & Bear LLP

(57) ABSTRACT

Audio data that includes speech may be transcribed by a speech recognition engine to generate speech recognition results, such as a transcription. One or more filters may be selected and applied to the speech recognition results to generate filtered speech recognition results. The one or more filters may be selected based at least in part on a characteristic of the speech recognition results, a characteristic of the audio data, or any other characteristic.

24 Claims, 18 Drawing Sheets

U.S. PATENT DOCUMENTS

| | | | |
|---|---|---|---|
| 6,532,446 B1 | 3/2003 | King | |
| 6,654,448 B1 | 11/2003 | Agraharam et al. | |
| 6,687,339 B2 | 2/2004 | Martin | |
| 6,687,689 B1 | 2/2004 | Fung et al. | |
| 6,760,700 B2 | 7/2004 | Lewis et al. | |
| 6,775,360 B2 | 8/2004 | Davidson et al. | |
| 6,816,578 B1 | 11/2004 | Kredo et al. | |
| 6,820,055 B2 | 11/2004 | Saindon et al. | |
| 6,895,084 B1 | 5/2005 | Saylor et al. | |
| 7,035,804 B2 | 4/2006 | Saindon et al. | |
| 7,089,184 B2 | 8/2006 | Rorex | |
| 7,181,387 B2 | 2/2007 | Ju et al. | |
| 7,200,555 B1 | 4/2007 | Ballard et al. | |
| 7,206,932 B1 | 4/2007 | Kirchoff | |
| 7,225,224 B2 | 5/2007 | Nakamura | |
| 7,233,655 B2 | 6/2007 | Gailey et al. | |
| 7,236,580 B1 | 6/2007 | Sarkar et al. | |
| 7,254,384 B2 | 8/2007 | Gailey et al. | |
| 7,260,534 B2 * | 8/2007 | Gandhi et al. | 704/270 |
| 7,302,280 B2 | 11/2007 | Hinckley et al. | |
| 7,313,526 B2 | 12/2007 | Roth et al. | |
| 7,330,815 B1 | 2/2008 | Jochumson | |
| 7,539,086 B2 | 5/2009 | Jaroker | |
| 7,571,100 B2 | 8/2009 | Lenir et al. | |
| 7,577,569 B2 | 8/2009 | Roth et al. | |
| 7,590,534 B2 | 9/2009 | Vatland | |
| 7,634,403 B2 | 12/2009 | Roth et al. | |
| 7,668,718 B2 | 2/2010 | Kahn et al. | |
| 7,716,058 B2 | 5/2010 | Roth et al. | |
| 7,890,586 B1 | 2/2011 | McNamara et al. | |
| 8,032,372 B1 | 10/2011 | Zimmerman et al. | |
| 8,050,918 B2 | 11/2011 | Ghasemi et al. | |
| 8,106,285 B2 * | 1/2012 | Gerl et al. | 84/615 |
| 8,117,268 B2 * | 2/2012 | Jablokov et al. | 709/206 |
| 8,135,578 B2 * | 3/2012 | Hebert | 704/9 |
| 8,145,493 B2 | 3/2012 | Cross et al. | |
| 2002/0035474 A1 | 3/2002 | Alpdemir | |
| 2002/0052781 A1 | 5/2002 | Aufricht et al. | |
| 2002/0165719 A1 | 11/2002 | Wang et al. | |
| 2002/0165773 A1 | 11/2002 | Natsuno et al. | |
| 2003/0008661 A1 | 1/2003 | Joyce et al. | |
| 2003/0028601 A1 | 2/2003 | Rowe | |
| 2003/0050778 A1 | 3/2003 | Nguyen et al. | |
| 2003/0101054 A1 | 5/2003 | Davis et al. | |
| 2003/0105630 A1 | 6/2003 | MacGinitie et al. | |
| 2003/0126216 A1 | 7/2003 | Avila et al. | |
| 2003/0200093 A1 | 10/2003 | Lewis et al. | |
| 2003/0212554 A1 | 11/2003 | Vatland | |
| 2004/0005877 A1 | 1/2004 | Vaananen | |
| 2004/0015547 A1 | 1/2004 | Griffin et al. | |
| 2004/0107107 A1 | 6/2004 | Lenir et al. | |
| 2004/0133655 A1 | 7/2004 | Yen et al. | |
| 2004/0151358 A1 | 8/2004 | Yanagita et al. | |
| 2005/0010641 A1 | 1/2005 | Staack | |
| 2005/0021344 A1 | 1/2005 | Davis et al. | |
| 2005/0080786 A1 | 4/2005 | Fish et al. | |
| 2005/0101355 A1 | 5/2005 | Hon et al. | |
| 2005/0197145 A1 | 9/2005 | Chae et al. | |
| 2005/0209868 A1 | 9/2005 | Wan et al. | |
| 2005/0239495 A1 | 10/2005 | Bayne | |
| 2005/0240406 A1 | 10/2005 | Carroll | |
| 2005/0261907 A1 | 11/2005 | Smolenski et al. | |
| 2005/0288926 A1 | 12/2005 | Benco et al. | |
| 2006/0052127 A1 | 3/2006 | Wolter | |
| 2006/0053016 A1 | 3/2006 | Falcon et al. | |
| 2006/0217159 A1 | 9/2006 | Watson | |
| 2007/0038740 A1 | 2/2007 | Steeves | |
| 2007/0061300 A1 | 3/2007 | Ramer et al. | |
| 2007/0079383 A1 | 4/2007 | Gopalakrishnan | |
| 2007/0115845 A1 | 5/2007 | Hochwarth et al. | |
| 2007/0118426 A1 | 5/2007 | Barnes, Jr. | |
| 2007/0118592 A1 | 5/2007 | Bachenberg | |
| 2007/0133771 A1 | 6/2007 | Stifelman et al. | |
| 2007/0156400 A1 | 7/2007 | Wheeler | |
| 2007/0180718 A1 | 8/2007 | Fourquin et al. | |
| 2007/0239837 A1 | 10/2007 | Jablokov et al. | |
| 2007/0255794 A1 | 11/2007 | Coutts | |
| 2008/0016142 A1 | 1/2008 | Schneider | |
| 2008/0040683 A1 | 2/2008 | Walsh | |
| 2008/0065737 A1 | 3/2008 | Burke et al. | |
| 2008/0155060 A1 | 6/2008 | Weber et al. | |
| 2008/0195588 A1 | 8/2008 | Kim et al. | |
| 2008/0198981 A1 | 8/2008 | Skakkebaek et al. | |
| 2008/0261564 A1 | 10/2008 | Logan | |
| 2008/0275864 A1 | 11/2008 | Kim et al. | |
| 2008/0275873 A1 | 11/2008 | Bosarge et al. | |
| 2008/0301250 A1 | 12/2008 | Hardy et al. | |
| 2009/0055175 A1 | 2/2009 | Terrell, II et al. | |
| 2009/0076917 A1 | 3/2009 | Jablokov et al. | |
| 2009/0083032 A1 | 3/2009 | Jablokov et al. | |
| 2009/0117922 A1 | 5/2009 | Bell et al. | |
| 2009/0124272 A1 | 5/2009 | White et al. | |
| 2009/0163187 A1 | 6/2009 | Terrell, II et al. | |
| 2009/0170478 A1 | 7/2009 | Doulton | |
| 2009/0182560 A1 | 7/2009 | White | |
| 2009/0228274 A1 | 9/2009 | Terrell, II et al. | |
| 2009/0240488 A1 | 9/2009 | White et al. | |
| 2009/0276215 A1 | 11/2009 | Hager | |
| 2010/0049525 A1 | 2/2010 | Paden | |
| 2010/0058200 A1 | 3/2010 | Jablokov et al. | |
| 2010/0180202 A1 | 7/2010 | Del Valle Lopez | |
| 2010/0182325 A1 | 7/2010 | Cederwall et al. | |
| 2010/0278453 A1 | 11/2010 | King | |

OTHER PUBLICATIONS

Brown, E., et al., Capitalization Recovery for Text, Springer-Verlag Berlin Heidelberg, 2002, 12 pages.

Desilets, A., et al., Extracting keyphrases from spoken audio documents, Springer-Verlag Berlin Heidelberg, 2002, 15 pages.

Gotoh, Y., et al., Sentence Boundary Detection in Broadcast Speech Transcripts, Proceedings of the ISCA Workshop, 2000, 8 pages.

Huang, J., et al., Extracting caller information from voicemail, Springer-Verlag Berlin Heidelberg, 2002, 11 pages.

Huang, J., et al., Maximum entropy model for punctuation annotation from speech, In: ICSLP 2002, pp. 917-920.

Justo, R., et al., Phrase classes in two-level language models for ASR, Springer-Verlag London Limited, 2008, 11 pages.

Kimura, K., et al., Association-based natural language processing with neural networks, In proceedings of the 7th annual meeting of the association of computational linguistics, 1992, pp. 223-231.

Ries, K., Segmenting conversations by topic, initiative, and style, Springer-Verlag Berlin Heidelberg, 2002, 16 pages.

Shriberg, E., et al., Prosody-based automatic segmentation of speech into sentences and topics, 2000, 31 pages.

Thomae, M., Fabian, T.,et al., Hierarchical Language Models for One-Stage Speech Interpretation, In Interspeech-2005, pp. 3425-3428.

Fielding, et al., Hypertext Transfer Protocol-HTTP/ 1.1, RFC 2616, Network Working Group (Jun. 1999), sections 7,9.5, 14.30, 12 pages total.

Glaser et al., Web-based Telephony Bridges for the Deaf, Proc. South African Telecommunications Networks & Applications Conference (SATNAC 2001), Wild Coast Sun, South Africa, 5 pages total.

Lewis et al., SoftBridge: An Architecture for Building IP-based Bridges over the Digital Divide. Proc. South African Telecommunications Networks & Applications Conference (SATNAC 2002), Drakensberg, South Africa, 5 pages total.

Marshall, James, HTTP Made Really Easy, Aug. 15, 1997, retrieved from http://developers.sun.com/mobility/midp/articles/sessions/ on Jul. 25, 2008, 7 pages total.

J2EE Application Overview, publicly available on http://www.orionserver.com/docs/j2eeoverview.html since Mar. 1, 2001. Retrieved on Oct. 26, 2007, 3 pages total.

David H. Kemsley, et al., A Survey of Neural Network Research and Fielded Applications, 1992, in International Journal of Neural Networks: Research and Application, vol. 2, No. 2/3/4, pp. 123-133. Accessed on Oct. 25, 2007 at http://citeseer.ist/psu.edu/cache/papers/cs/25638/ftp:zSzzSzaxon.cs.byu.eduzSspubzSzpaperszSzkemsley_92.pdf/kemsley92survey.pdf, 12 pages total.

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

vBulletin Community Forum, thread posted on Mar. 5, 2004. Page retrieved on Oct. 26, 2007 from http://www.vbulletin.com/forum/showthread.php?t=96976, 1 page total.

Transl8it! translation engine, publicly available on http://www.transl8it.com since May 30, 2002. Retrieved on Oct. 26, 2007, 6 pages total.

Knudsen, Jonathan, Session Handling in MIDP, Jan. 2002, retrieved from http://www.developers.sun.com/mobility/midp/articles/sessions/ on Jul. 25, 2008, 7 pages total.

* cited by examiner

| Adam  | Hey, do you want to meet for coffee? |
|-------|---------------------------------------|
| Sally | I can meet you at twelve thirty, but I can only stay twenty five minutes. |
| Adam  | Bring cash--I need to borrow twenty dollars. |
| Sally | Okay, see you later. |

*FIG. 6*

| Adam  | hey [silence] do you want to meet for coffee |
|-------|----------------------------------------------|
| Sally | i can meet you at twelve thirty [silence] but i can only stay twenty five minutes |
| Adam  | bring cash [silence] i need to borrow twenty dollars |
| Sally | ok [silence] see you later |

*FIG. 7*

| Adam  | hey do you want to meet for coffee |
|-------|-------------------------------------|
| Sally | i can meet you at twelve thirty but i can only stay twenty five minutes |
| Adam  | bring cash i need to borrow twenty dollars |
| Sally | ok see you later |

*FIG. 8*

| Adam | hey do you want to meet for coffee |
|---|---|
| Sally | i can meet you at twelve thirty but i can only stay twenty five minutes |
| Adam | bring cash i need to borrow twenty dollars |
| Sally | ok see you later |

*FIG. 9*

| Adam | hey do you want to meet for coffee |
|---|---|
| Sally | i can meet you at 12:30 but i can only stay 25 minutes |
| Adam | bring cash i need to borrow $20 |
| Sally | ok see you later |

*FIG. 10*

| Adam | hey do u want 2 meet 4 coffee |
|---|---|
| Sally | i can meet u @ 12:30 but i can only stay 25 minutes |
| Adam | bring $$ i need 2 borrow $20 |
| Sally | ok c u l8r |

*FIG. 11*

```
POST /Yap/Login HTTP/1.1
Host: www.icynine.com:8080
User-Agent:  Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

FIG. 14

Login/Login HEADER

| Request Headers | Request Body | Response Body |
|---|---|---|
| User-Agent | NA | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 15*

Yap/Login HEADER

| Request Headers | Request Body | Response Body |
|---|---|---|
| User-Agent | NA | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 16*

| SUBMIT HEADER | | |
|---|---|---|
| Request Headers | Request Body | Response Body |
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (optional) | | |
| Yap-Return-Cells | | |
| Yap-Return-TTS | | |
| Yap-Content-Type | | |
| Yap-Content-Length | | |

Binary Data Field

FIG. 17

RESULTS HEADER

| Request Headers | Request Body | Response Body |
|---|---|---|
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

FIG. 18

Returns: an XML Hierarchy containing

- result--the body of result xml
- result-type
- result-code
- result-code-description
- result text
- result-is-silence
- result-details
- result-conf
- lattice

FIG. 19

TTS Header

| Request Headers | Request Body | Response Body |
|---|---|---|
| User-Agent | NA | TTS Binary Audio Data |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

FIG. 20

CORRECT HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

FIG. 21

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

FIG. 22

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

FIG. 23

FILTERING TRANSCRIPTIONS OF UTTERANCES

I. CROSS-REFERENCE TO RELATED APPLICATION

This application is a continuation of U.S. patent application Ser. No. 12/614,571, filed on Nov. 9, 2009, which is a continuation of U.S. patent application Ser. No. 12/198,112, filed on Aug. 25, 2008, which published as U.S. Patent Pub. No. 2009/0124272 on May 14, 2009. U.S. patent application Ser. No. 12/198,112 is a continuation-in-part of U.S. patent application Ser. No. 11/697,074, filed Apr. 5, 2007, now U.S. Pat. No. 8,117,268, issued on Feb. 14, 2012, which claims priority to U.S. Provisional Patent Application No. 60/789,837, filed Apr. 5, 2006. U.S. patent application Ser. No. 12/198,112 also claims priority to the following applications:

(1) U.S. Provisional Patent Application No. 60/957,706, filed Aug. 23, 2007;
(2) U.S. Provisional Patent Application No. 60/972,851, filed Sep. 17, 2007;
(3) U.S. Provisional Patent Application No. 60/972,936, filed Sep. 17, 2007;
(4) U.S. Provisional Patent Application No. 61/021,335, filed Jan. 16, 2008;
(5) U.S. Provisional Patent Application No. 61/038,046, filed Mar. 19, 2008; and
(6) U.S. Provisional Patent Application No. 61/041,219, filed Mar. 31, 2008.

Each of the foregoing patent applications from which priority is claimed, and any corresponding patent application publications thereof, are hereby incorporated herein by reference in their entirety. Additionally, the disclosure of provisional application 60/789,837 is contained in Appendix A attached hereto and, likewise, is incorporated herein in its entirety by reference and is intended to provide background and technical information with regard to the systems and environments of the inventions of the current provisional patent application. Similarly, the disclosure of the brochure of Appendix B is incorporated herein in its entirety by reference.

Finally, the disclosures of each of the following patent applications, and any corresponding patent application publications thereof, are incorporated herein by reference: U.S. nonprovisional patent application Ser. No. 12/198,116, filed Aug. 25, 2008 and titled "FACILITATING PRESENTATION BY MOBILE DEVICE OF ADDITIONAL CONTENT FOR A WORD OR PHRASE UPON UTTERANCE THEREOF," which application is a continuation-in-part of U.S. nonprovisional patent application Ser. No. 12/197,227, filed Aug. 22, 2008; and U.S. nonprovisional patent application Ser. No. 12/197,213, filed Aug. 22, 2008. Additionally, U.S. provisional patent application Ser. No. 60/957,701, filed Aug. 23, 2007, U.S. provisional patent application Ser. No. 60/957,702, filed Aug. 23, 2007, U.S. provisional patent application Ser. No. 60/972,853, filed Sep. 17, 2007, U.S. provisional patent application Ser. No. 60/972,854, filed Sep. 17, 2007, U.S. provisional patent application Ser. No. 60/972,943, filed Sep. 17, 2007, U.S. provisional patent application Ser. No. 60/972,944, filed Sep. 17, 2007, U.S. provisional patent application Ser. No. 61/016,586, filed Dec. 25, 2007, U.S. provisional patent application Ser. No. 61/021,341, filed Jan. 16, 2008, U.S. provisional patent application Ser. No. 61/034,815, filed Mar. 7, 2008, and U.S. provisional patent application Ser. No. 61/091,330, filed Aug. 22, 2008, are each incorporated herein by reference.

II. COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

III. BACKGROUND OF THE PRESENT INVENTION

Automatic Speech Recognition ("ASR") systems convert speech into text. As used herein, the term "speech recognition" refers to the process of converting a speech (audio) signal to a sequence of words or a representation thereof (text), by means of an algorithm implemented as a computer program. Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), and content-based spoken audio searching (e.g. finding a podcast where particular words were spoken).

As their accuracy has improved, ASR systems have become commonplace in recent years. For example, ASR systems have found wide application in customer service centers of companies. The customer service centers offer middleware and solutions for contact centers. For example, they answer and route calls to decrease costs for airlines, banks, etc. In order to accomplish this, companies such as IBM and Nuance create assets known as IVR (Interactive Voice Response) that answer the calls, then use an ASR system paired with TTS (Text-To-Speech) software to decode what the caller is saying and communicate back to him.

More recently, ASR systems have found application with regard to text messaging. Text messaging usually involves the input of a text message by a sender who presses letters and/or numbers associated with the sender's mobile phone. As recognized for example in the aforementioned, commonly-assigned U.S. patent application Ser. No. 11/697,074, it can be advantageous to make text messaging far easier for an end user by allowing the user to dictate his or her message rather than requiring the user to type it into her phone. In certain circumstances, such as when a user is driving a vehicle, typing a text message may not be possible and/or convenient, and may even be unsafe. On the other hand, text messages can be advantageous to a message receiver as compared to voicemail, as the receiver actually sees the message content in a written format rather than having to rely on an auditory signal.

Many other applications for speech recognition and ASR systems will be recognized as well.

Currently, the state-of-the-art speech transcription engines use statistical language models ("SLMs") to transcribe freeform speech into text. This is in contrast to using finite grammars which describe patterns of words which can be spoken by the user and received and processed by the ASR system. Finite grammars are much more limited to phrases, which the engine can recognize, but generally provide better accuracy. The current state of speech recognition engines allows either an SLM or a finite grammar to be active when transcribing speech from audio data, but not both at the same time.

Thus, an approach is needed where an ASR system makes use of both the SLM for returning results from the audio data, and finite grammars used to post-process the text results. An approach is also needed where custom filters are used that are configured to detect and modify words and word groups. Using this approach permits text results to be generated that can be presented to a user formatted in a way that looks more typical of how a human would have written a text message. It will be recognized that this same principle is useful in other applications of ASR engines as well.

IV. SUMMARY OF THE INVENTION

The present invention includes many aspects and features. Moreover, while many aspects and features relate to, and are described in, the context of instant messaging and SMS messaging, the present invention is not limited to use only in such contexts, as will become apparent from the following summaries and detailed descriptions of aspects, features, and one or more embodiments of the present invention. For instance, the invention is equally applicable to use in the context of voicemails and emails.

Accordingly, in a first aspect of the invention a method for facilitating mobile device messaging includes the steps of: receiving audio data communicated from the mobile communication device, the audio data representing an utterance that is intended to be at least a portion of the text of the message that is to be sent from the mobile communication device to a recipient; transcribing the utterance to text based on the received audio data to generate a transcription; applying a filter to the transcribed text to generate a filtered transcription, the text of which is intended to mimic language patterns of mobile device messaging that is performed manually by users; and communicating the filtered transcription to the recipient.

In a feature of this aspect, the mobile communication device, to which the filtered transcription is communicated, is the mobile communication device from which the audio data is received.

In a feature of this aspect, the mobile communication device, to which the filtered transcription is communicated, is a mobile communication device of the recipient of the message.

In features of this aspect, the audio data is communicated from the mobile communication device using the HTTP/HTTPS protocol and is communicated over the Internet.

In another feature of this aspect, the utterance is transcribed using a language model such as a statistical language model ("SLM") or a Hierarchical Language Model ("HLM").

In a feature of this aspect, a filter may include a list of predetermined words (e.g., a list of predetermined words comprising a hash table). Each predetermined word of the list is associated with another predetermined word. In this regard, the step of applying a filter to the transcribed text includes comparing words from the transcribed text to the list of words of the filter and, upon a matching word, replacing the matching word with the associated, predetermined word as specified by the filter. Furthermore, as used herein, a "word" means in preferred embodiments an alphanumeric string (whether found in a dictionary or not) as well as a phrase, i.e., a grouping of words. Moreover, the grouping of words collectively may have a meaning that may be distinct from the meaning of any individual word (an example of such a "word" is an idiom like "holy cow").

In another feature of this aspect, the filter that is applied comprises a finite grammar.

In another feature of this aspect, the filter that is applied comprises a software filter.

In another feature of this aspect, the method further includes the step of selecting one or more filters to apply to the transcribed text from a group of filters that may be applied to the transcribed text to generate the filtered transcription. In this respect, the selection of the one or more filters to apply may be made based on an indication that is received in conjunction with the recorded audio data received from the mobile communication device. Alternatively, the selection of the filters to apply to the transcribed text may be made on based on an indication is included within a header of the communication from the mobile communication device in which the audio data is received; or the selection of the one or more filters to apply may be made based on preferences of a user of a mobile communication device, including the user of the mobile communication device from which the audio data is received or a user of a mobile device to which the message is sent.

In another feature, a filter may include a list of respective, predetermined operations that are performed for a predetermined word or other characteristic found in the text of transcribed utterance. For example, a predetermined operation may include the insertion of punctuation when a certain silence threshold is reached in the utterance. Another predetermined operation may include the insertion of a targeted advertising based on a predetermined word that is found in the transcribed list. Moreover, such targeted ad insertion may further be based on location information of the mobile communication device, which may be communicated from the mobile device and which may be determined by the mobile communication device using a GPS component of the mobile communication device.

The filter that is applied preferably includes one or more of the following types of filters: an ad filter; a caller name filter; a caller number filter; a closing filter; a contraction filter; a currency filter; a date filter; a digit filter; a digit format filter; a digit homonym filter; an engine filter; a greeting filter; a hyphenate filter; a number filter; a profanity filter; an ordinal filter; a proper noun filter; a punctuation filter; a sentence filter; a shout/scream filter; an SMS filter; a tag filter; and a time filter.

With regard to the ad filter, when the ad filter is applied to the transcribed text, an advertisement is inserted into the transcribed text based on, and in association with, predetermined keywords that are identified in the transcribed text.

In another feature, the mobile communication device is a mobile phone, such as a smartphone or similar device, including the current iPhone manufactured by Apple or the Razr line of phone manufactured by Motorola.

In another aspect, a method for facilitating mobile device messaging includes the steps of: receiving from a mobile communication device, both a destination address for sending a message to a recipient, and audio data representing an utterance that represents the text of the message that is to be sent to the recipient; transcribing the utterance to text based on the received audio data to generate a transcription; applying a filter to the transcribed text to generate a filtered transcription, the text of which is intended to mimic language patterns of mobile device messaging that is performed manually by users; and communicating to the recipient the filtered transcription as the text of the message.

In another aspect of the invention, a method for facilitating mobile device messaging includes the steps of: receiving from a mobile communication device, both a destination address for sending a message to a recipient, and audio data representing an utterance that represents the text of the message that is to be sent to the recipient; transcribing the utterance to text based on the received audio data to generate a transcription; applying a filter to the transcribed text to generate a filtered transcription, the text of which is intended to mimic language patterns of mobile device messaging that is performed manually by users; communicating to the filtered transcription to the mobile communication device; presenting the filtered transcription by the mobile communication device for verifying; and sending to the recipient from the mobile communication device the filtered transcription as the text of the message.

In a feature of this aspect, the method further includes revising the filtered transcription presented by the mobile communication device for verifying. In this regard, the filtered transcription that is sent as the text of the message is a revised, filtered transcription.

In another aspect of the invention, a method facilitating mobile device messaging includes the steps of: receiving audio data representing a voicemail that has been left for a recipient; transcribing the voicemail to text based on the received audio data to generate a transcription; applying a filter to the transcribed text to generate a filtered transcription, the text of which is intended to mimic language patterns of mobile device messaging that is performed manually by users; and communicating the filtered transcription to a mobile communication device of the recipient.

In a feature of this aspect, the filtered transcription is communicated as a text message, using the SMS protocol, to the mobile communication device of the recipient of the voicemail.

In a feature of this aspect, the filtered transcription is communicated as an instant message to the mobile communication device of the recipient of the voicemail.

In a feature of this aspect, the filtered transcription is communicated as an email to the mobile communication device of the recipient of the voicemail.

In a feature of this aspect, the filter that is applied to the transcribed text to generate the filtered transcription includes a sentence punctuation filter that inserts a sentence punctuation character into the transcribed text based on a duration of silence between two words in the recorded audio data. In this regard, a pronunciation preferably is inserted into the transcribed text when a duration of silence between two words in the recorded audio data exceeds a predetermined threshold value. For example, a comma is inserted into the transcribed text when a duration of silence between two words in the recorded audio data exceeds a first predetermined threshold value (such as 0.20 milliseconds) but does not exceed a second predetermined threshold value (such as 0.49 milliseconds), the second predetermined threshold being greater than the first predetermined threshold value. Moreover, a period then is inserted into the transcribed text when a duration of silence between two words in the recorded audio data exceeds the second predetermined threshold value, and the first letter of the word immediately following the duration of silence that exceeds the second predetermined threshold value is capitalized.

In another feature of this aspect, the filter that is applied to the transcribed text to generate the filtered transcription includes a digit homonym filter. The digit homonym filter inserts a digit, in substitution for a word that is a homonym to the digit, when such word is found immediately in-between two digits in the transcribed text. The digit homonym filter preferably is applied after a digit filter is applied, which filter converts words into digits when determined to be appropriate.

In another feature of this aspect, the utterance is transcribed using a language model comprising a statistical language model.

In another feature of this aspect, the utterance is transcribed using a language model comprising a hierarchical language model.

In another feature of this aspect, a filter includes a list of predetermined words, including phrases and alphanumeric strings, wherein each predetermined word is associated with another predetermined word, including a predetermined phrase or a predetermined alphanumeric string. The of applying a filter to the transcribed text in such case includes comparing words, including phrases and alphanumeric strings, from the transcribed text to the list of words of the filter and, upon a match, replacing the matching word, including a phrase or alphanumeric string, with the associated, predetermined word including a predetermined phrase or a predetermined alphanumeric string.

In another feature of this aspect, the filter that is applied comprises a finite grammar.

In another feature of this aspect, the filter that is applied comprises a software filter.

In another feature of this aspect, the method further includes the step of selecting one or more filters to apply to the transcribed text from a group of filters that may be applied to the transcribed text to generate the filtered transcription. The selection of the one or more filters to apply may be made based on an indication that is received in conjunction with the recorded audio data received representing the voicemail; or may be made based on preferences of the recipient of the voicemail.

The group of filters preferably includes: a caller name filter; a caller number filter; a closing filter; a contraction filter; a currency filter; a date filter; a digit filter; a digit format filter; a digit homonym filter; an engine filter; a greeting filter; a hyphenate filter; a number filter; a profanity filter; an ordinal filter; a proper noun filter; a punctuation filter; a sentence filter; a shout/scream filter; an SMS filter; a tag filter; and a time filter.

In yet another feature of this aspect, the step of applying a filter to the transcribed text to generate a filtered transcription includes applying an ad filter, whereby advertisement is inserted into the transcribed text based on, and in association with, predetermined keywords that are identified in the transcribed text.

In another feature, the mobile communication device comprises a mobile phone.

In another aspect of the invention, a method includes the steps of: receiving audio data communicated representing an utterance; transcribing the utterance to text based on the received audio data to generate a transcription; and applying a filter to the transcribed text to generate a filtered transcription; wherein the filter that is applied to the transcribed text to generate the filtered transcription includes a sentence punctuation filter that inserts a sentence punctuation character into the transcribed text based on a duration of silence between two words in the recorded audio data.

In a feature, a character is inserted into the transcribed text when a duration of silence between two words in the recorded audio data exceeds a predetermined threshold value.

In a feature, a comma is inserted into the transcribed text when a duration of silence between two words in the recorded audio data exceeds a first predetermined threshold value but does not exceed a second predetermined threshold value, the second predetermined threshold being greater than the first predetermined threshold value. Preferably, a period preferably is inserted into the transcribed text when a duration of silence between two words in the recorded audio data exceeds the second predetermined threshold value, and the method further includes capitalizing the first letter of the word immediately following the duration of silence that exceeds the second predetermined threshold value.

In yet another aspect of the invention, a method includes the steps of: receiving audio data communicated representing an utterance; transcribing the utterance to text based on the received audio data to generate a transcription; and applying a filter to the transcribed text to generate a filtered transcription; wherein the filter that is applied to the transcribed text to generate the filtered transcription includes a digit homonym filter that inserts a digit, in substitution for a word that is a homonym to the digit, when such word is found immediately in-between two digits in the transcribed text.

In a feature of the invention, a digit filter is first applied to the transcribed utterance before the digit homonym filter is applied to the transcribed utterance.

In a feature of the invention, the digit homonym filter includes a list of predetermined words that are homonyms to digits. In this respect, the list of the digit homonym filter comprises a hash table. Preferably, the words "for", "won", "ate", "to", and "too" are represented in the list, and are replaced respectively by the filter with "4", "1", "8", "2", and "2".

In addition to the aforementioned aspects and features of the present invention, it should be noted that the present invention further encompasses the various possible combinations and subcombinations of such aspects and features.

V. BRIEF DESCRIPTION OF THE DRAWINGS

Further aspects, features, embodiments, and advantages of the present invention will become apparent from the following detailed description with reference to the drawings, wherein:

FIG. 6 is a log of utterances of an exemplary conversation between two users;

FIG. 7 is a log illustrating unfiltered transcriptions of utterances of the exemplary conversation of FIG. 6

FIG. 8 is a log illustrating filtered transcriptions of utterances of the exemplary conversation of FIG. 6, shown with the indications of silence removed;

FIG. 9 is a log illustrating identification of word groupings of filtered transcriptions of utterances of the exemplary conversation of FIG. 6;

FIG. 10 is a log illustrating filtered transcriptions of utterances of the exemplary conversation of FIG. 6, shown after groups of sequential words are applied to a finite grammar to convert the plain text into a more natural format;

FIG. 11 is a log illustrating filtered transcriptions of utterances of the exemplary conversation of FIG. 6, shown after being passed through an SMS filter;

FIG. 14 is a typical header section of an HTTP request from the client in the commercial implementation;

FIG. 15 illustrates exemplary protocol details for a request for a location of a login server and a subsequent response;

FIG. 16 illustrates exemplary protocol details for a login request and a subsequent response;

FIG. 17 illustrates exemplary protocol details for a submit request and a subsequent response;

FIG. 18 illustrates exemplary protocol details for a results request and a subsequent response;

FIG. 19 illustrates exemplary protocol details for an XML hierarchy returned in response to a results request;

FIG. 20 illustrates exemplary protocol details for a text to speech request and a subsequent response;

FIG. 21 illustrates exemplary protocol details for a correct request;

FIG. 22 illustrates exemplary protocol details for a ping request; and

FIG. 23 illustrates exemplary protocol details for a debug request.

VI. DETAILED DESCRIPTION OF THE PREFERRED EMBODIMENTS

Figure 1:
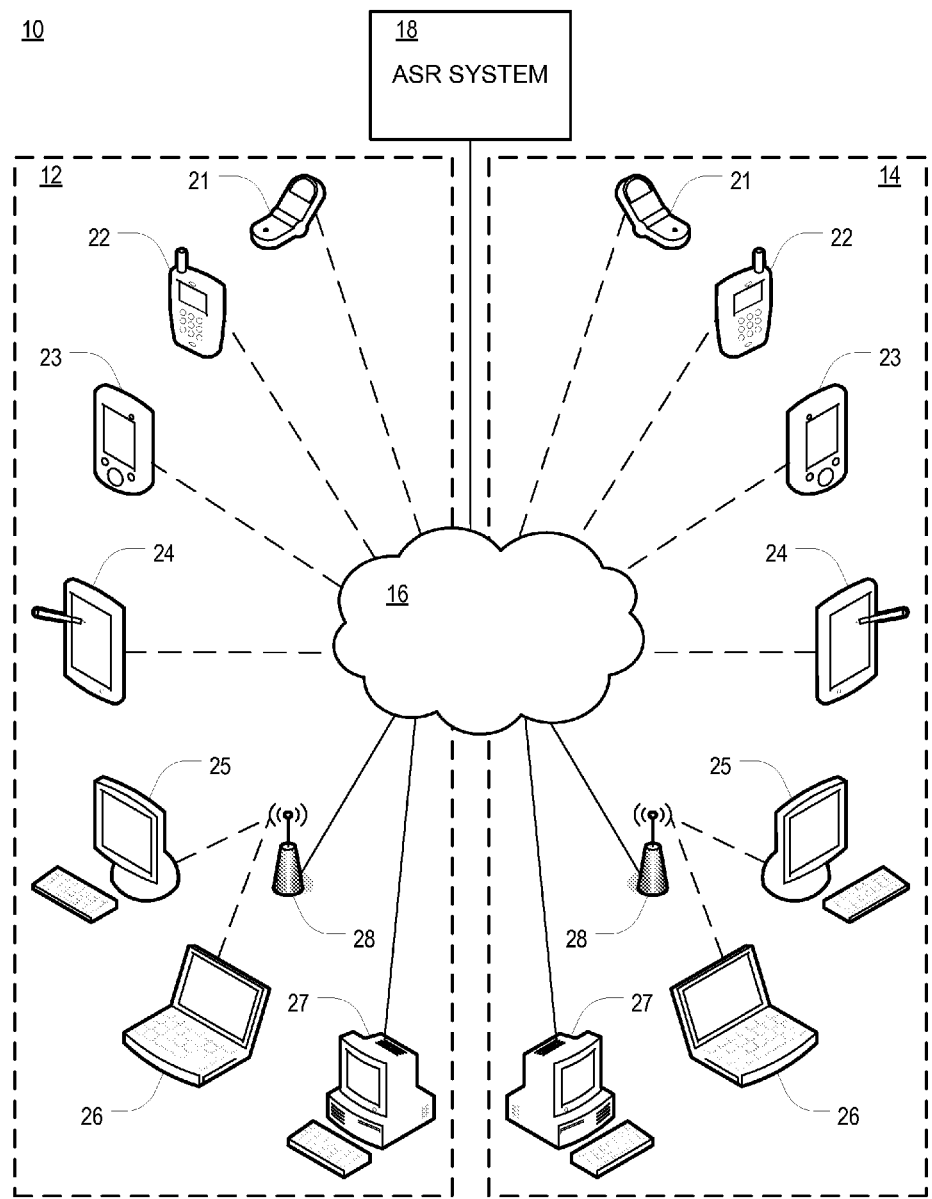
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an ASR system 18, including an ASR engine. Transmitting and receiving devices 12,14 may include cell phones 21, smart phones 22, PDAs 23, tablet notebooks 24, various desktop and laptop computers 25,26,27, and the like. One or more of the devices 12,14, such as the illustrated iMac and laptop computers 25,26, may connect to the network systems 16 via wireless access point 28. The various transmitting and receiving devices 12,14 (one or both types of which being sometimes referred to herein as "client devices") may be of any conventional design and manufacture.

Figure 2:
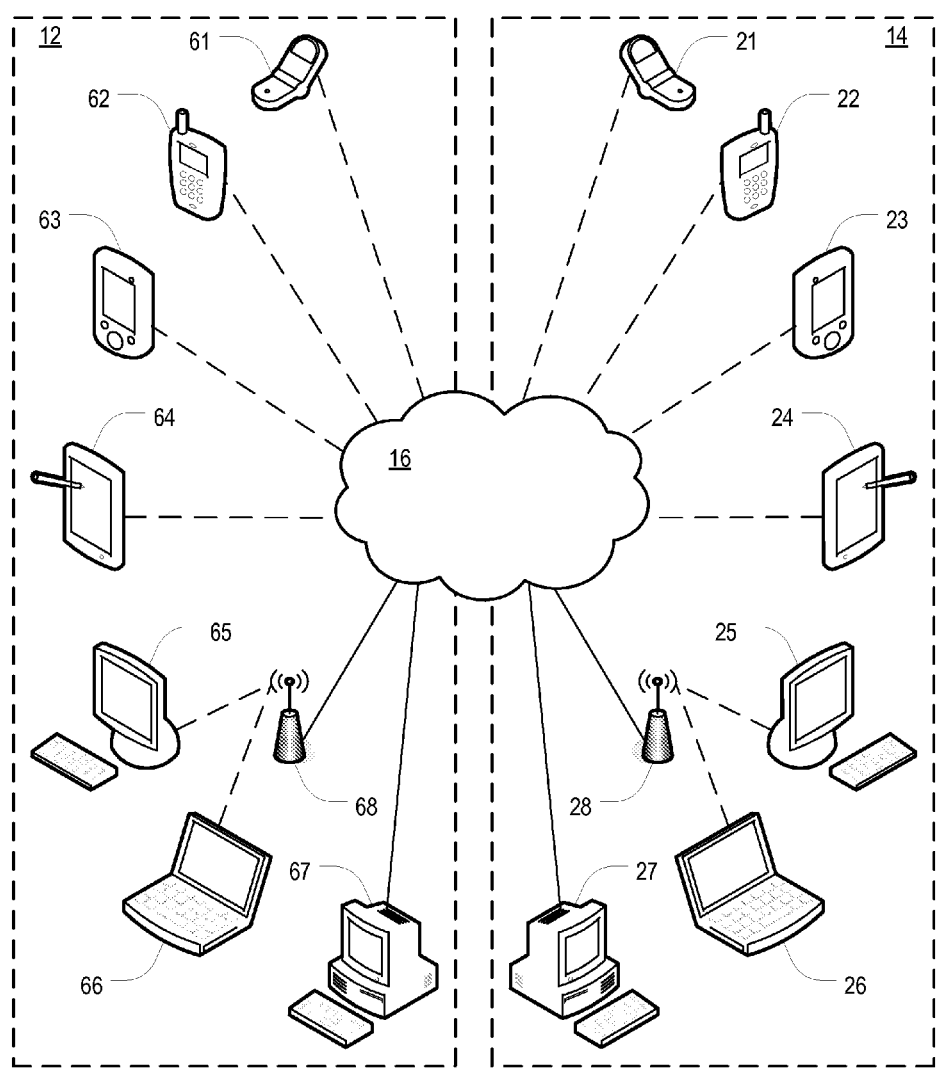
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided elsewhere herein, in the incorporated applications and/or in the incorporated Appendices attached hereto. Furthermore, in the context of text messaging, the communication systems 10,60 each preferably includes, inter alia, a telecommunications network. In the context of instant messaging, the communications systems 10,60 each preferably includes, inter alia, the Internet.

Figure 3:
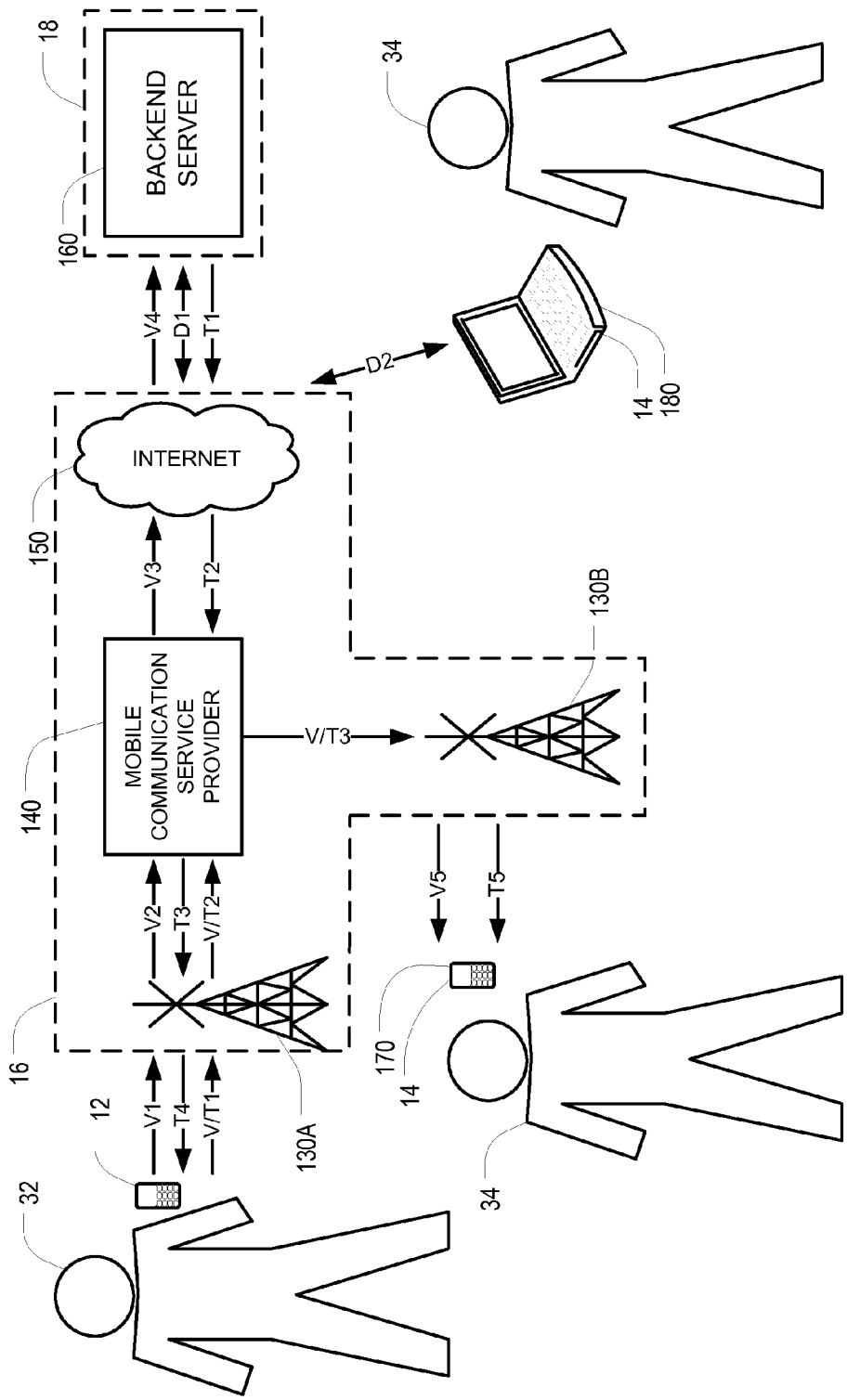
FIG. 3 is a block diagram of an exemplary implementation of the system of FIG. 1.

More particularly, and as described, for example, in the aforementioned U.S. Patent Application Pub. No. US 2007/0239837, FIG. 3 is a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating under joint or independent control) and the Internet 150. The backend server 160 is or may be placed in communication with the mobile phone 12 via the mobile communication service provider 140 and the Internet 150. The mobile phone 12 has a microphone, a speaker and a display.

A first transceiver tower 130A is positioned between the mobile phone 12 (or the user 32 of the mobile phone 12) and the mobile communication service provider 140, for receiving an audio message (V1), a text message (T3) and/or a verified text message (V/T1) from one of the mobile phone 12 and the mobile communication service provider 140 and transmitting it (V2, T4, V/T2) to the other of the mobile phone 12 and the mobile communication service provider 140. A second transceiver tower 130B is positioned between the mobile communication service provider 140 and mobile devices 170, generally defined as receiving devices 14 equipped to communicate wirelessly via mobile communication service provider 140, for receiving a verified text message (V/T3) from the mobile communication service provider 140 and transmitting it (V5 and T5) to the mobile devices 170. In at least some embodiments, the mobile devices 170 are adapted for receiving a text message converted from an audio message created in the mobile phone 12. Additionally, in at least some embodiment, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance, thus generating an audio message, V1. At this stage, the audio message V1 is recorded in the mobile phone 12. By releasing the button, the recorded audio message V1 is sent to the backend server 160 through the mobile communication service provider 140.

In the exemplary embodiment of the present invention as shown in FIG. 3, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the Internet 150. The Internet 150 outputs the audio message V3 into an audio message V4 and transmits it (V4) to the backend server 160. The content of all the audio messages V1-V4 is identical.

The backend server 160 then transcribes the audio message V4 to text using an SLM. The transcribed text is an unfiltered transcription which is then filtered using one or more filters. The backend server 160 determines one or more filters to apply, and an order in which to apply them, and then filters the transcription accordingly. Preferably, one or more of these filters utilizes a finite grammar to refine the unfiltered transcription. Some of these filters, however, may simply be software filters utilizing software algorithms that alter the transcribed text. Exemplary filters of both types are described in more detail hereinbelow. The output of the filter process is a filtered transcription.

The determination of the number and type of filters to be applied, as well as the order in which they are to be applied, may be informed by direct or indirect user selections. Information representing such selection(s) may be transmitted to the backend server 160 together with the audio message. Alternatively, this information may be provided in user preference settings, which may be stored on either the mobile phone 12, at the mobile communication service provider 140, on the Internet 150, or at the backend server 160. As a further alternative, a user may simply indicate a type of message to be sent (such as a text message or an instant message), or a specific recipient or type of recipient (such as a work contact or a friend), and settings associated with that selection, stored in one of the above numerated locations, may be utilized.

While it is preferred that transcription and filtering be performed at a backend server 160, it is possible that such a backend server 160 may comprise a plurality of servers each communicating with at least one other of the plurality of servers. In this case, the transcription and filtering may occur on different servers, and filtering may even occur on a plurality of servers. It is also possible, however, that the backend server 160 consists of a single server.

After the transcription and filtering, the filtered transcription is sent as a text message, T1, and/or a digital signal, D1 back to the Internet 150, which outputs them into a text message T2 and a digital signal D2, respectively. The text message T1 and the digital signal D1 correspond to two different formats of the audio message V4.

The digital signal D2 is transmitted to a digital receiver 180, generally defined as a receiving device 14 equipped to communicate with the Internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T2 is sent to the mobile communication service provider 140 that outputs it (T2) into a text message T3. The output text message T3 is then transmitted to the first transceiver tower 130A. The first transceiver tower 130A then transmits it (T3) to the mobile phone 12 in the form of a text message T4. It is noted that the substantive content of all the text messages T1-T4 may be identical, which is the transcribed and filtered text of the audio messages V1-V4.

Upon receiving the text message T4, the user 32 verifies it and sends the verified text message V/T1 to the first transceiver tower 130A that in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system may be utilized to convert an audio message into a text message. In at least one implementation, this may be accomplished by first initializing a transmitting device so that the transmitting device is capable of communicating with a backend server 160. Second, a user 32 speaks to or into the client device so as to create a stream of an audio message. The audio message can be recorded and then transmitted to the backend server 160, or the audio message can be simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is then transcribed and filtered at the backend server 160 as described hereinabove. The filtered transcription is then sent as a text message back to the client device 12. Upon the user's verification, the transcribed and filtered text message is forwarded to one or more recipients 34 and their respective receiving devices 14, where the text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Additionally, in at least one implementation, advertising messages and/or icons may be displayed on one or both types of client devices 12,14 according to keywords contained in the transcribed text message, wherein the keywords are associated with the advertising messages and/or icons. One or more such implementations are described in more detail in one or more of the incorporated references, including U.S. patent application Ser. No. 12/197,227.

Still further, in at least one implementation, one or both types of client devices 12,14 may be located through a global positioning system (GPS); and listing locations, proximate to the position of the client device 12,14, of a target of interest may be presented in the converted text message. Additionally, filter selection and/or formatting preferences may be altered or selected based upon a determined location, as described more fully hereinbelow.

Figure 4A:
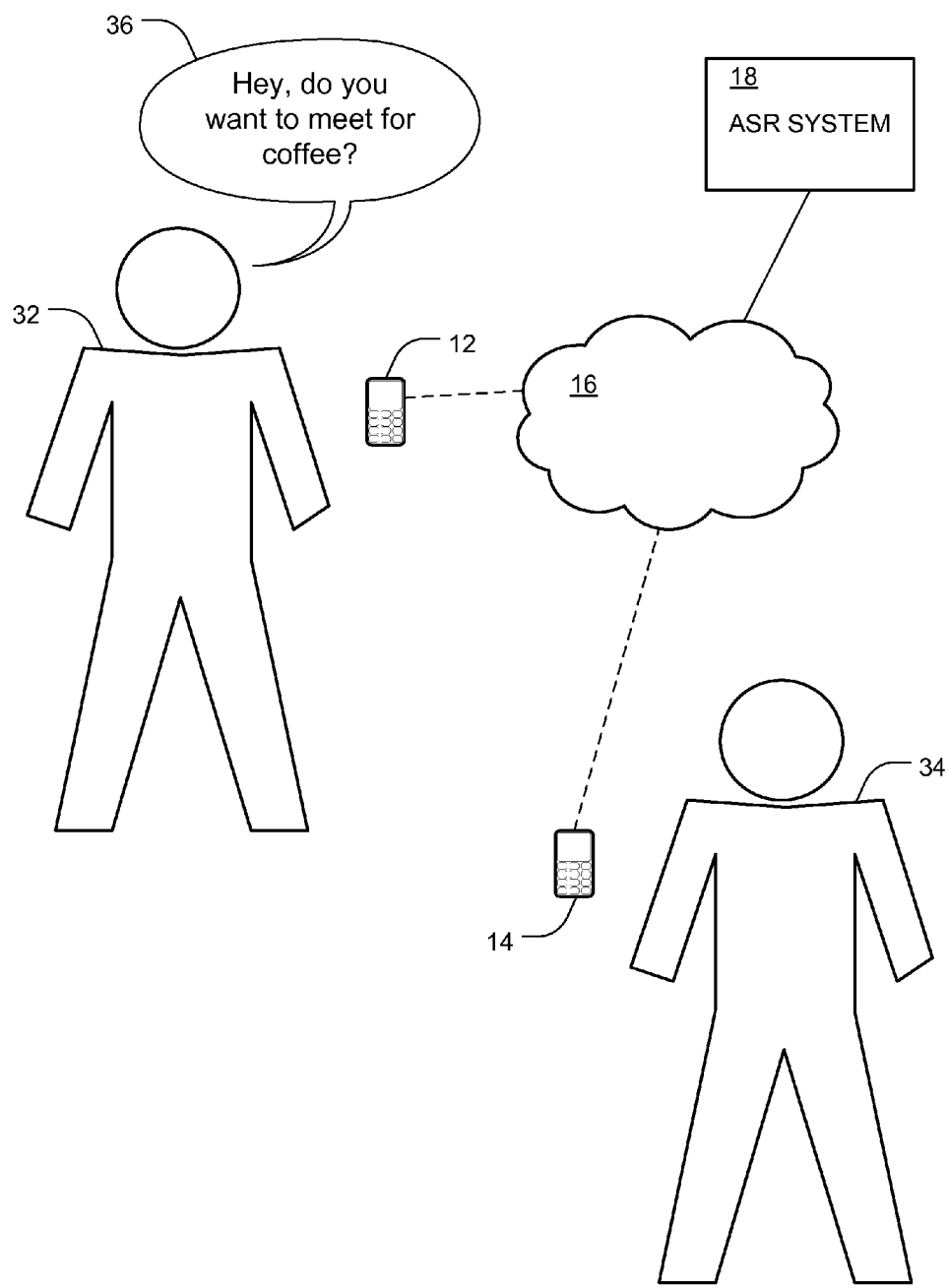
FIG. 4A is a block diagram illustrating a first user making use of a portion of the communication system of FIG. 1.
Figure 4B:
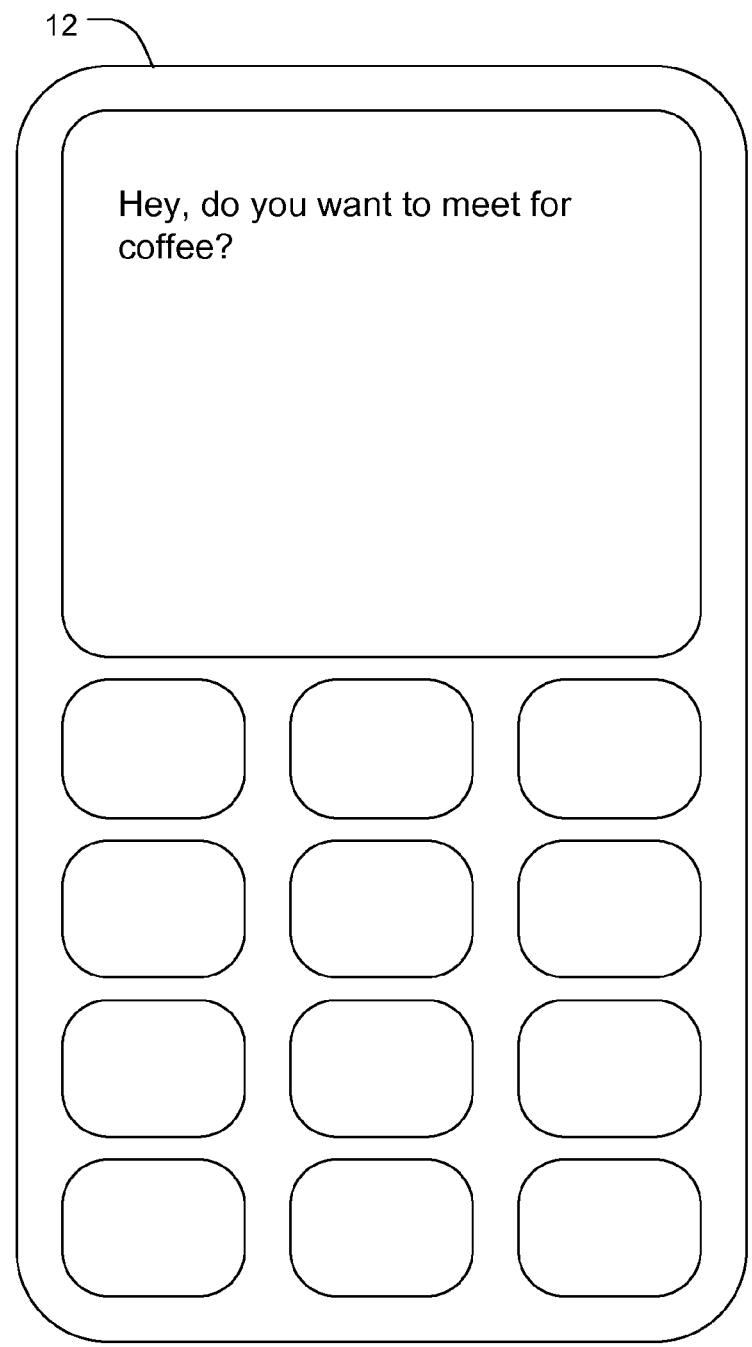
FIG. 4B is a graphical depiction, on a communication device, of the transcription of the utterance of FIG. 4A.

FIG. 4A is a block diagram illustrating a first user 32 making use of a portion of the communication system 10 of FIG. 1. As shown therein, a first user 32 is utilizing the system 10 to communicate with a second user 34. More particularly, the first user 32 in FIG. 4A is speaking an utterance 36 into the first device 12, which in this context may be referred to as a "transmitting device," and the utterance is sent as recorded audio data to the ASR system 18. In FIG. 4A, the utterance 36 is "Hey, do you want to meet for coffee?" This utterance may be transmitted to the ASR 18, which attempts to convert the speech into text by first transcribing it using a statistical language model (SLM) and then applying one or more filters. In at least some embodiments, the first user 32 and/or the second user 34 may select, via user preferences and/or directly, one or more filters to apply or not apply. Further, in at least some embodiments, the language text thus created may then be transmitted directly to the second device 14, which in this context may be referred to as a "receiving device," without further review by the first user 32. In other embodiments, the language text may first be displayed on the first device 12 for approval by the first user 32 before being sent to the second device 14. FIG. 4B is a graphical depiction, on the first communication device 12, of a filtered transcription of the utterance 36 of FIG. 4A.

Figure 4C:
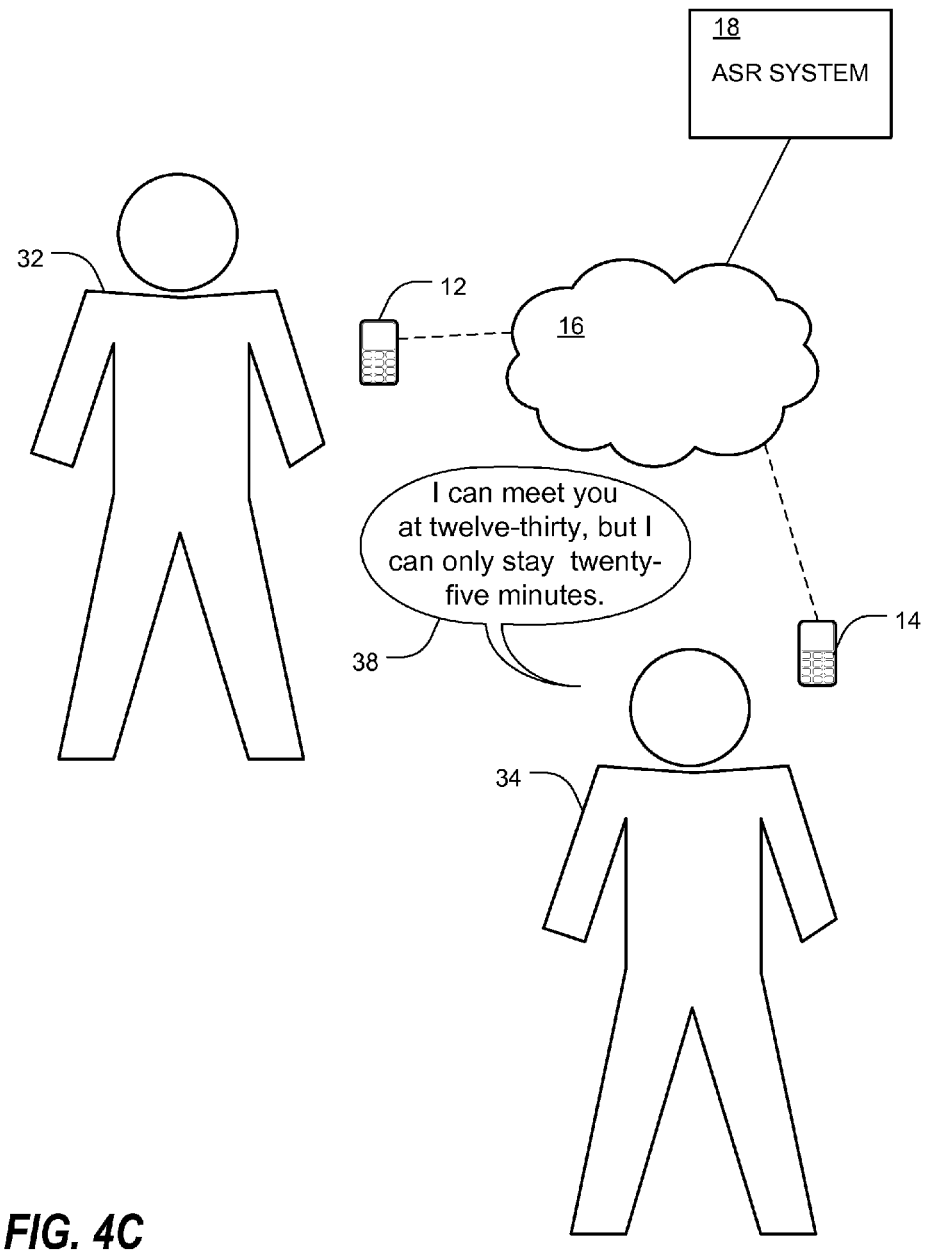
FIG. 4C is a block diagram illustrating a second user making use of a portion of the communication system of FIG. 1.
Figure 4D:
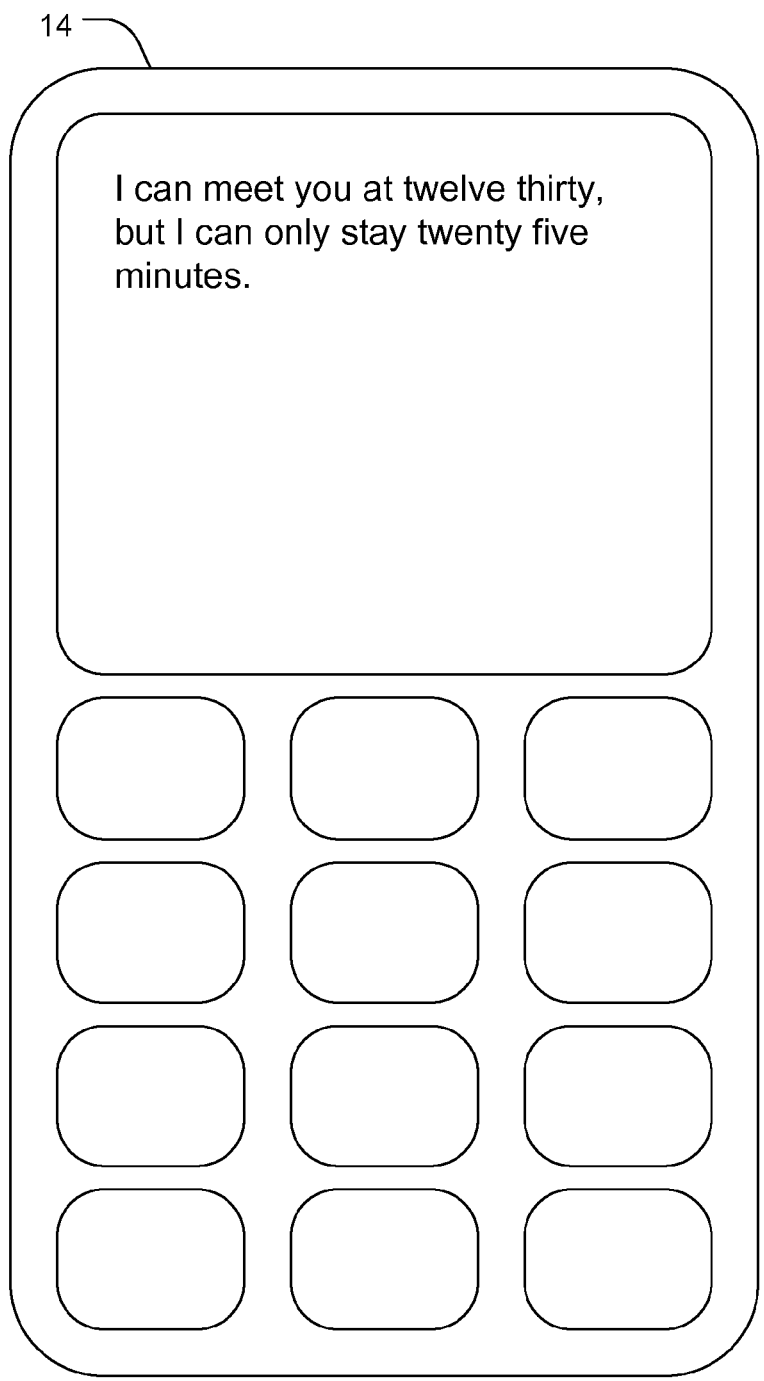
FIG. 4D is a graphical depiction, on a receiving device, of the transcription of the utterance of FIG. 4C.

FIG. 4C is a block diagram illustrating a second user 34 making use of a portion of the communication system 10 of FIG. 1. As shown therein, the second user 34 is utilizing the system 10 to communicate with the first user 32. More particularly, the second user 34 in FIG. 4C is speaking an utterance 38 into the second device 14, which in this context may be referred to as a "transmitting device," and the recorded speech audio is sent to the ASR system 18. In FIG. 4C, the utterance 38 is "I can meet you at twelve-thirty, but I can only stay twenty-five minutes." This utterance may be transmitted to the ASR 18, which attempts to convert the speech into text by first transcribing it using an SLM and then applying one or more filters. Once again, in at least some embodiments, the first user 32 and/or the second user 34 may select, via user preferences and/or directly, one or more filters to apply or not apply. Further still, in at least some embodiments, the language text thus created may then be transmitted directly to the first device 12, which in this context may be referred to as a "receiving device," without further review by the second user 34. In other embodiments, the language text may first be displayed on the second device 14 for approval by the second user 34 before being sent to the first device 12. FIG. 4D is a graphical depiction, on the second communication device 14, of a filtered transcription of the utterance 38 of FIG. 4C.

A conversation between the two users 32,34 may continue in this fashion, with each user 32,34 speaking into his or respective communication device 12,14, each utterance 36,38 being transcribed and filtered into a filtered transcription, and the filtered transcription being transmitted to the other device 14,12, either with or without the approval of the user 12,14 before such transmission. FIG. 6 is a log of an exemplary conversation, comprised of a series of utterances, between the two users 32,34. Notably, each utterance of FIG. 6 is displayed in a formal manner in that the utterance is shown with all words and numbers spelled out and with formal punctuation and capitalization.

Figure 5:
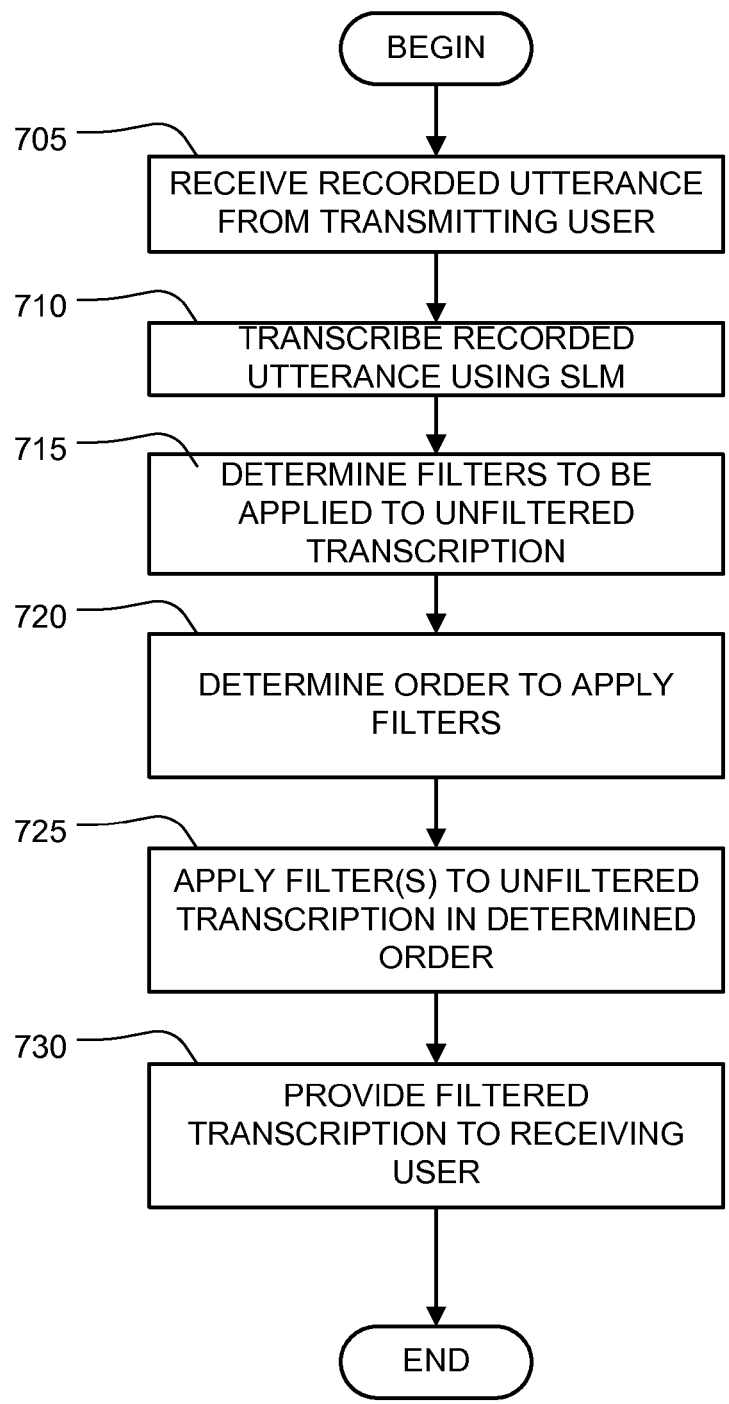
FIG. 5 is a flowchart illustrating the operation of a speech engine, for example of the ASR system of FIG. 1, in accordance with preferred embodiments of the present invention.

FIG. 5 is a flowchart illustrating the operation of a speech engine, for example of the ASR system 18 of FIG. 1, in accordance with one or more preferred embodiments of the present invention. As shown therein, a process 700 carried out by the speech engine begins at step 705 with a recorded utterance 36,38 being received by the speech engine from a transmitting communication device 12,14. At step 710, the speech engine transcribes the utterance 36,38 using a statistical language model (SLM) to create an unfiltered transcription. FIG. 7 is a log illustrating unfiltered transcriptions of the utterances of the exemplary conversation of FIG. 6. Notably, the speech engine has injected "[silence]" tags into the unfiltered transcriptions to indicate short periods of silence in the recorded utterances 36,38.

At step 715, the speech engine determines whether one or more filters should be applied to the unfiltered transcription, and at step 720 the speech engine determines an order in which filters should be applied. These determinations may be informed by information received together with the recorded utterance and/or by user preferences, stored in one or more of the locations as described hereinabove. In the present example, it is determined that a tag filter should be applied, followed by a series of finite grammar filters, and then a software filter that reformats the text into a form containing common text messaging abbreviations.

At step 725 a filter is used to eliminate, or alternatively to replace with punctuation, the injected or inserted indications of silence. FIG. 8 is a log illustrating filtered transcriptions of the recorded utterances of the exemplary conversation of FIG. 6, shown with indications of silence removed. Subsequently, another filter is used to identify sequential word groupings which qualify to be applied to a finite grammar (or finite state grammar), which is understood to have the meaning generally ascribed to such term in the field of speech recognition. FIG. 9 is a log of the exemplary conversation of FIG. 6, shown with several such word groupings identified. Several examples of such finite grammars are shown in Table 1, but it will be appreciated that any number of such finite grammars may be used without departing from the scope of the present invention. Each grouping of sequential words is then filtered using a selected finite grammar to convert the plain text into a more natural format. For example, unfiltered transcription "i only have twenty five dollars" may be scanned using a currency filter, which would determine that the words "twenty" "five" and "dollars" make up a sequential word grouping "twenty five dollars". A date and time grammar is then applied to this sequential word grouping, and the output is used to replace the sequential word grouping, creating the filtered transcription "i only have $25".

It will be appreciated that a single filter may implement, utilize or apply one or more finite grammars, or, preferably, a different filter may be used to implement, utilize, or apply each finite grammar. FIG. 10 is a log illustrating filtered transcriptions of the recorded utterances of the exemplary conversation of FIG. 6 after a number of filters have applied a number of finite grammars to identified groupings.

TABLE 1

| Unfiltered Transcription | Finite Grammar | Filtered Transcription |
| --- | --- | --- |
| twelve thirty | Date and Time Grammar | 12:30 |
| twenty five | Numbers Grammar | 25 |
| twenty dollars | Currency Grammar | $20 |

Finally, the text is passed through a short message service ("SMS") filter which converts identified words and/or word groupings to common SMS shortcuts. FIG. 11 is a log illustrating filtered transcriptions of the recorded utterances of the exemplary conversation of FIG. 6, shown after being passed through such an SMS filter.

The description above is exemplary in nature. A wide variety of filters are available to format speech engine results, only a few of which have thus far been described.

Time Filter

A first such filter is a time filter. Functionality of an exemplary time filter has been described hereinabove. A time filter can be used to format time phrases. For example, the unfiltered transcription "twelve thirty p m" could be converted to the filtered transcription "12:30 P.M." Likewise, the unfiltered transcription "eleven o clock in the morning" could be converted to the filtered transcription "11:00 A.M." In at least some embodiments, a user may select, either directly or via a user preferences setting, a format he or she wishes time values to be filtered to.

Currency Filter

Exemplary functionality of a second such filter, a currency filter, was also described hereinabove. A currency filter can be used to format monetary amounts. For example, the unfiltered transcription "i need to borrow one hundred dollars" could be converted to the filtered transcription "i need to borrow $100", or, alternatively, "I need to borrow $100.00". As with the time filter, in at least some embodiments, a user may select, either directly or indirectly, a format he or she wishes currency values to be filtered to.

Digit, Digit Format, Number, and Ordinal Filters

A digit filter can be used to format utterances of digits. For example, the unfiltered transcription "my phone number is seven seven seven six five zero three" could be converted to the filtered transcription "my phone number is 7 7 7 6 5 0 3". Additionally, a separate digit format filter can be used which can also format utterances of digits. A digit format filter will strip spaces from between digits and optionally insert one or more hyphens into digit strings with a length of 7, 10, or 11. The filtered transcription above could be further filtered using the digit format filter to the filtered transcription "my phone number is 777-6503".

It will be appreciated that the digit filter described above may not properly handle larger numbers. To address this, a number filter may additionally be used to filter large numbers. For example, the unfiltered transcription "order five thousand widgets" could be converted using the number filter to the filtered transcription "order 5,000 widgets".

Ordinal numbers can be treated with another filter. An ordinal number filter can be used to convert ordinal numbers, such as "first", "sixtieth" and "thousandth". For example, the unfiltered transcription "i finished in sixth place" could be converted to the filtered transcription "i finished in 6th place".

Date Filter

Another filter, a date filter, can be used to format dates. For example, the unfiltered transcription "he was born on the twenty second of february in seventeen twenty two" could be converted to the filtered transcription "he was born on Feb. 22, 1722". Similarly, the unfiltered transcription "he was killed on march fifteenth forty four b. c." could be converted to the filtered transcription "he was killed on Mar. 15, 44 BC". (Who are George Washington and Julius Caesar, respectively.)

Caller Name Filter

Another filter, a caller name filter, can be used to compare each word in a transcription with each name (first, middle, last, etc.) of the originator or recipient of the message the transcription is associated with. This name is preferably extracted in the manner of caller ID, but alternatively may be extracted from an address book. For example, the unfiltered transcription "hey this is wheel call me back" could be converted to "hey this is Will call me back". When the utterance "hey, this is Will, call me back" is transcribed by the SLM, possible alternate transcriptions, or alternate words of a transcription, may be stored in addition to an unfiltered transcription. By comparing each name of the originator and/or recipient with alternate words of a transcription, it can be determined whether one of the transcribed words or phrases should be replaced with the name of the caller or recipient.

Caller Number Filter

Similarly, a caller number filter can be used to compare each word in a transcription with a number of the originator or recipient of the message the transcription is associated with. This number is preferably extracted in the manner of caller ID, but alternatively may be extracted from an address book. For example, the unfiltered transcription "hey call me back at 8531234" that was received from Will, whose phone number is 8501234 could be converted to the filtered transcription "hey call me back at 8501234" (it is worth noting that a hyphen may further be inserted between the third and fourth digits, either by this filter, or by another filter, but such insertion has been omitted to simplify this example). It will be appreciated that this could be accomplished in any number of ways, such as, for example, comparing a plurality of digits of a string of digits of the unfiltered transcription with a plurality of digits of the caller's number.

Closing Filter

Another filter, a closing filter, can be used to replace words at the end of a recorded utterance. For example, it is typical to end a conversation with "bye" or "thanks," however, an SLM may transcribe this speech as "by" or "tanks" The closing filter could be applied to the unfiltered transcription "please call my secretary tanks" to produce the text "please call my secretary thanks" Likewise, the unfiltered transcription "Call me back by" could be converted to the filtered transcription "Call me back bye".

Greeting Filter

Similarly, a greeting filter can be used to replace words at the beginning of a recorded utterance. For example, it is typical to begin conversations with "hi" or "hey," however, an SLM may transcribe these words as "hay", or possibly even "weigh" or "tie". If a word at the beginning of a transcription rhymes with a greeting word, it can be replaced with the appropriate word it rhymes with. The greeting filter could be applied to the unfiltered transcription "hay jeff this is sandy" to produce the filtered transcription "hey jeff this is sandy".

Hyphenate Filter

A spoken letter, for example "b", may be transcribed by an SLM in a variety of ways. One common transcription method is to transcribe an individually spoken letter as the lowercase letter followed by a period. For example, the utterance "My name is John Doe, spelled D O E" would be transcribed as "my name is john doe spelled d. o. e." A filter may be used to render this output more easily readable. A hyphenate filter can convert the transcribed text of such single spoken letters into hyphenated letters, so that the above unfiltered transcription would become the filtered transcription "my name is john doe spelled d-o-e".

Contraction Filter

A contraction filter can be used to replace two or more words with a contraction of those words. For example, the unfiltered transcription "i can not do that" could be converted to the filtered transcription "i can't do that".

Proper Noun Filter

A proper noun filter can be used to capitalize proper nouns. For example, the unfiltered transcription "go to las vegas nevada" could be converted to the filtered transcription "go to Las Vegas Nev.", or alternatively to the filtered transcription "go to Las Vegas, Nev.".

Obscenity Filter

An obscenity filter can be used to replace obscene words with censoring characters or text. For example, the unfiltered transcription "i just stepped in dog shit" could be converted to the filtered transcription "i just stepped in dog ####", or alternatively, "i just stepped in dog poo".

Sentence Punctuation Filter

A Sentence Punctuation Filter attempts to punctuate text from an ASR system based on silence duration information that is provided by the ASR system as part of the transcription.

Essentially, the transcribed text is converted into sentences by adding periods, commas, or other forms of punctuation based on silence duration information.

For example, suppose the ASR system generates the following text:

"hi this is bob <sil 0.56> i was wondering <sil 0.23> um <sil 0.13> if you are going to the football game"

In this example, the ASR system has detected three places of silence, represented by the <sil #.##> tags. The first is 0.56 milliseconds in duration; the next is 0.23 milliseconds in duration; and the third is 0.13 milliseconds in duration. Based on this silence duration information, the filter inserts punctuation characters. Specifically, a punctuation character is inserted between text immediately preceding and following a silence duration that exceeds a predetermined threshold.

So, suppose the filter is configured to replace any silence durations of 0.50 milliseconds and above with a period and any silence duration of between 0.20 milliseconds and 0.49 milliseconds with a comma. Any silence below 0.20 milliseconds is ignored.

When the filter is applied to the text, the result is:

"hi this is bob. I was wondering, um if you are going to the football game"

As a secondary function, this filter also capitalizes the first letter of the next word if it inserts a period into the text. This is done to maintain readability.

Formatting of the text into proper grammatical sentence structure is not necessarily accomplished by this filter. Instead, the filter simply inserts punctuation based on pause durations in speech.

Shout/Scream Filter

Speech at a high volume can be characterized as a shout, and speech at an even higher volume can be characterized as a scream. Phrases transcribed by the ASR engine may contain an indication of such a high or abnormally high volume. In the event of such a high volume, a shout/scream filter may alter the transcribed text to further convey this shout or scream. The text of the transcribed phrase may be capitalized and exclamation marks appended to the phrase. For example, the phrase "it is almost midnight", which is associated with an indication that it was spoken at a high volume, may be converted to "IT IS ALMOST MIDNIGHT!". Likewise, the phrase "help me", which is associated with an indication that it was spoken at an even higher volume, may be converted to "HELP ME!!!".

Digit Homonym Filter

There are instances where the ASR system returns a word that sounds like the word that was uttered, but actually is spelled differently. The digit homonym filter is configured to address instances like this.

Such instances are most obvious when someone utters a phone number and the ASR system mistakenly returns "for" instead of "four" or "ate" instead of "eight". This digit homonym filter is configured to replace these misrecognized words with their corresponding numeric equivalents.

For example, suppose the following unfiltered transcription is returned by the ASR system:

"call me back at three four for five one seven eight"

The word "for" is actually supposed to be the word "four", but the ASR system misrecognized it as "for". Applying the digit filter generates the following text:

"call me back at 34 for 5 1 7 8"

Next, applying the digit homonym filter generates the following text:

"call me back at 3 4 4 5 1 7 8"

In particular, the filter stores a list of known digit homonym words, which include "for", "won", "ate", "to", and "too". If a digit homonym word from the list is encountered in the transcribed text, then the filter looks at the word preceding it and the word following it to see if they are both digits and, if so, then the digit homonym filter replaces the homonym word with its numeric equivalent.

Note that the order of applying the digit filter and the digit homonym filter is important; the digit filter should be applied first before the digit homonym filter.

Tag/Engine Filter

When a spoken phrase is transcribed by an ASR engine, certain tags and symbols may be inserted by the engine. A tag filter and/or an engine filter may be used to remove these tags and symbols. For example, the transcribed phrase "i just wanted <s> to thank you </s>" could be converted to "i just wanted to thank you".

SMS Filter

An SMS filter can be used to convert transcribed text into a format more commonly used by a person while texting. For example, the spoken phrase "talk to you later" may be converted to "ttyl". The SMS filter could be used to convert the transcribed phrase "i did not see you at the party and wanted to say thanks for the gift talk to you later" to "i did not c u @ the party and wanted to say thx 4 the gift ttyl".

Priority Filter

A priority filter can be used to screen a transcription for determination as to a priority level of the utterance underlying the transcription. For example, a priority filled can screen a transcription for the words "hospital" or "emergency". If one of these words is found, a priority level of a message associated with the transcription can be set and/or an action can be taken. For example, the unfiltered transcription "meet me at the hospital, I broke my leg" may trigger the priority filter and cause it to flag the associated message with a higher priority. In the context of SMS messaging, a loud ring, alarm, or beep may be triggered by an incoming SMS message having a high priority. In an email context, a higher priority email may be flagged as high priority.

Screening

More generally, screening filters are known in the context of, for example, email. Similar screening filters may be applied to screen transcriptions.

Ad Filter

An ad filter can be used to insert ads or clickable and/or voice clickable links. These ads or links are associated with additional content as is described more fully in one or more of the incorporated references, including U.S. patent application Ser. No. 12/197,227. An existing word, phrase, sentence, or syllable can be converted to a clickable link. Each link can display additional information when a user interacts with it via a user interface, such as by popping up additional information when a user mouses over it. Engaging such a link, for example by clicking on it or "voice clicking" it, can effect navigation to a webpage or otherwise provide additional content.

It will be appreciated the above filters can be used either independently or in combination. It will further be appreciated that when using the above described filter in combination, the order in which the filters are applied may alter the results. For example, because the sentence filter relies on indications of silence contained within tags, it must be applied before the tag filter is applied to remove tags. In at least some embodiments, a user may select, either directly or via user preference settings, which filters will be applied. In at least some embodiments a user may even select in which order the filters will be applied.

The above described filters are software filters. At least some of them represent software algorithms designed to enhance and refine transcribed text, while others utilize finite grammars to refine transcribed text, and still others represent a combination of both. Preferably, each filter comprises a software function or subroutine that may be called.

Commercial Implementation

One commercial implementation of the foregoing principles is the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 12:
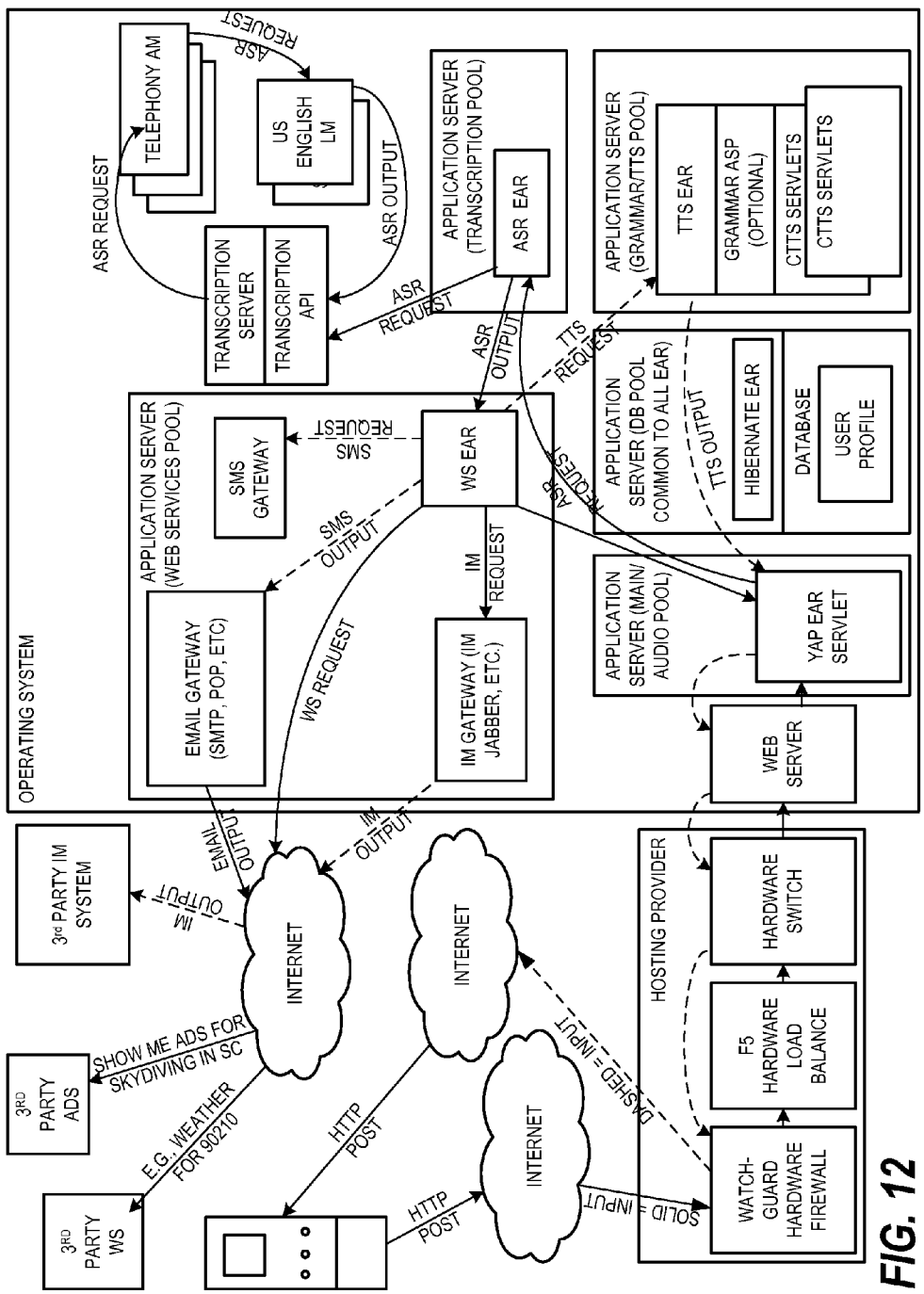
FIG. 12 is a block diagram of the system architecture of one commercial implementation.

FIG. 12 is a block diagram of the system architecture of the Yap commercial implementation. With reference to FIG. 12, the operating system may be implemented in Red Hat Enterprise Linux 5 (RHEL 5); the application servers may include the Websphere Application Server Community Edition (WAS-CE) servers, available from IBM; the web server may be an Apache server; the CTTS Servlets may include CTTS servlets from Loquendo, including US/UK/ES male and US/UK/ES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 13:
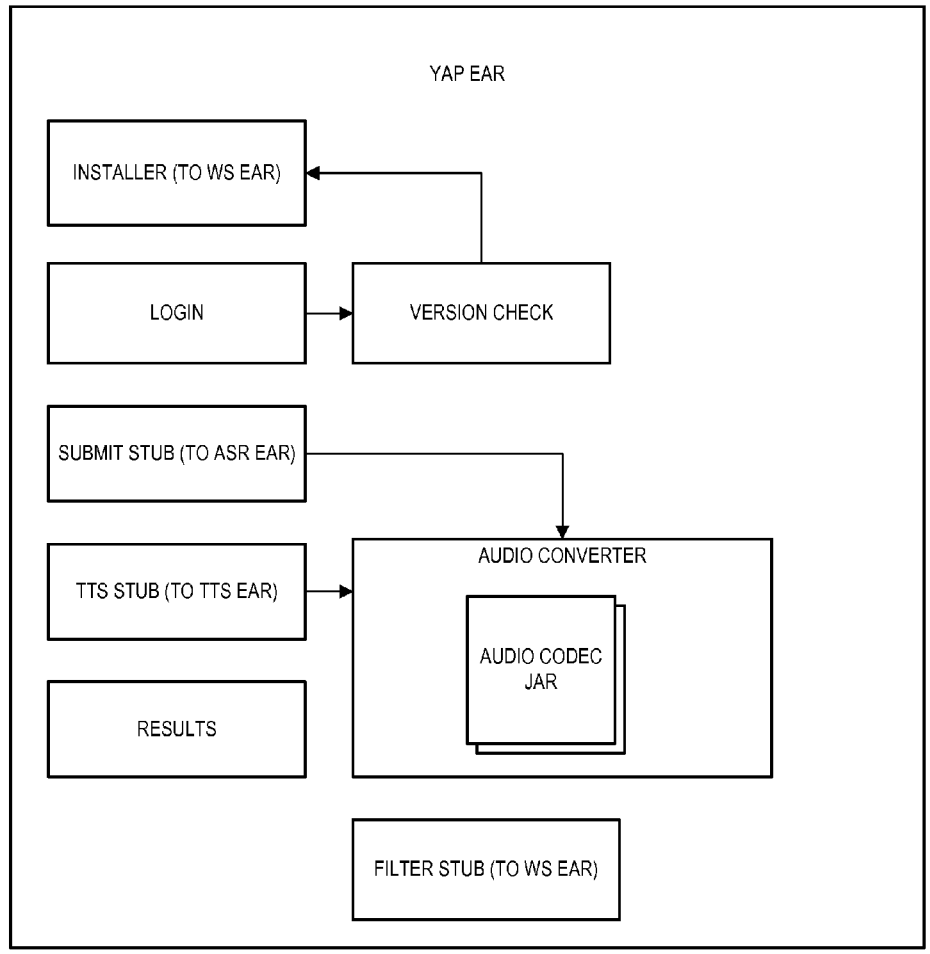
FIG. 13 is a block diagram of a portion of FIG. 12.

FIG. 13 is a block diagram of the Yap EAR of FIG. 12. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the Hyper-Text Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 14 is a typical header section of an HTTP request from the Yap client.

The Yap client is operated via a user interface (UI), known as "Yap9," which is well suited for implementing methods of converting an audio message into a text message and messaging in mobile environments. Yap9 is a combined UI for SMS and web services (WS) that makes use of the buttons or keys of the client device by assigning a function to each button (sometimes referred to as a "Yap9" button or key). Execution of such functions is carried out by "Yaplets." This process, and the usage of such buttons, are described elsewhere herein and, in particular, in FIGS. 9A-9D, and accompanying text, of the aforementioned U.S. Patent Application Pub. No. US 2007/0239837.

Usage Process—Install:

Installation of the Yap client device application is described in the aforementioned U.S. Patent Application Pub. No. US 2007/0239837 in a subsection titled "Install Process" of a section titled "System Architecture."

Usage Process—Notify:

When a Yap client is installed, the install fails, or the install is canceled by the user, the Notify servlet is sent a message by the phone with a short description. This can be used for tracking purposes and to help diagnose any install problems.

Usage Process—Login:

When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 15. An HTTP string pointing to a selected login server will be returned in response to this request. It will be appreciated that this selection process functions as a poor man's load balancer.

After receiving this response, a login request is sent. Exemplary protocol details for such a request can be seen in FIG. 16. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:

;jsessionid=C240B217F2351E3C420A599B0878371A

All requests from the client simply append this cookie to the end of each request and the session is maintained:

/Yap/Submit;
jsessionid=C240B217F2351E3C420A599B0878371A

Usage Process—Submit:

After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 17.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those described hereinabove.

Notably, after all of the filters are applied, both the filtered text and original text are returned to the client so that if text to speech is enabled for the user, the original unfiltered text can be used to generate the TTS audio.

Usage Process—Results:

The client retrieves the results of the audio by taking the receipt returned from the Submit servlet and submitting it as a request to the Results servlet. Exemplary protocol details for such a request can be seen in FIG. 18. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 19. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS:

The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 20. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct:

As a means of tracking accuracy and improving future SMS based language models, if the user makes a correction to transcribed text on the phone via the keypad before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 21.

Usage Process—Ping:

Typically, web sessions will timeout after a certain amount of inactivity. The Ping servlet can be used to send a quick message from the client to keep the session alive. Exemplary protocol details for such a message can be seen in FIG. 22.

Usage Process—Debug:

Used mainly for development purposes, the Debug servlet sends logging messages from the client to a debug log on the server. Exemplary protocol details can be seen in FIG. 23.

Usage Process—Logout:

To logout from the Yap server, an HTTP logout request needs to be issued to the server. An exemplary such request would take the form: "/Yap/Logout;jsessionid=1234", where 1234 is the session ID.

User Preferences:

In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Alternative Contexts and Implementations

It will be appreciated that although one or more embodiments in accordance with the present invention have been described above in the context of SMS messaging and instant messaging, the invention is susceptible of use in a wide variety of contexts and applications. Generally, it is contemplated that filters and finite grammars may be utilized in any context in which an ASR engine is utilized. More specifically, filters and finite grammars can be used in combination with an SLM in a voice mail context, a command context, a customer service context, a contact navigation and input context, and a navigation context. In each of these contexts, transcription and filtering may be performed either locally, or at a remote server (or a plurality of remote servers).

In a voice mail context, a voicemail is stored as recorded audio data, i.e. a recorded utterance. This recorded utterance can be transcribed to text using an SLM. This unfiltered transcription is then filtered using one or more filters as described more fully hereinabove in the context of SMS messaging. Preferably, the unfiltered transcription is filtered using a finite grammar filter. The output of this process is a filtered transcription that can be presented to a user as an SMS message, email, or instant message. It will be appreciated that after being transcribed to text, various additional filters other than those described hereinabove may be utilized. For example, a screening filter may screen out messages that fail to include certain words or phrases selected by the user. Similarly, a priority filter, similar to the one described hereinabove in the context of SMS messaging, may be utilized to prioritize messages including certain words or phrases. For example, transcriptions containing the word "emergency" or "hospital" could be flagged as high priority and an action taken, such as, for example, sending an email to an address of the user.

In a command context, a user may speak an utterance that is heard by a microphone of a user device. The utterance is stored as recorded audio data, and the recorded utterance can then be transcribed to text using an SLM. This unfiltered transcription is then filtered using one or more filters as described more fully hereinabove in the context of SMS messaging. Preferably, the unfiltered transcription is filtered using a finite grammar filter. As described above, this transcription and filtering may be performed at a remote server. In this context, a filter may alter the unfiltered transcription to represent instructions for the user device in computer readable format. These instructions (which represent a filtered transcription) may then be transmitted back to the user device to be acted on by the user device.

In a customer service context, a user speaks an utterance that is recorded as audio data. Preferably this user speaks an utterance into a standard telephone that is received by a remote server. This recorded utterance can then be transcribed to text using an SLM, either at the same remote server or at a different remote server. The use of ASR engines in a customer service context is well known. Unlike in conventional use, however, the SLM transcription is filtered using one or more filters as described more fully hereinabove in the context of SMS messaging. Preferably, the unfiltered transcription is filtered using a finite grammar filter.

In a contact navigation and input context, a user may speak an utterance that is heard by a microphone of a user device. The utterance is stored as recorded audio data, and the recorded utterance can then be transcribed to text using an SLM. This unfiltered transcription is then filtered using one or more filters as described more fully hereinabove in the context of SMS messaging. Preferably, the unfiltered transcription is filtered using a finite grammar filter. As described above, this transcription and filtering may be performed at a remote server. In this event, the filtered transcription is transmitted back to the user device, which device may then perform an action based upon the filtered transcription. For example, a user may utter "Add Bob to my Contacts, seven zero four five five three three zero zero." This utterance may be transcribed by an SLM, either locally or remotely, to "add bob to my contacts seven zero for five five five three three zero zero". This unfiltered transcription may then be filtered to machine readable instructions to create a new contact named Bob with the specified phone number. For example, one or more filters may be applied to output the filtered transcription: "contacts.add('Bob, 7045553300')". The user device may then act on this filtered transcription to add a new contact In a navigation context, a user may speak an utterance that is heard by a microphone of a user device. The utterance is stored as recorded audio data, and the recorded utterance can then be transcribed to text using an SLM. This unfiltered transcription is then filtered using one or more filters as described more fully hereinabove in the context of SMS messaging. Preferably, the unfiltered transcription is filtered using a finite grammar filter. As described above, this transcription and filtering may be performed either locally or at a remote server. In this context, a filter may alter the unfiltered transcription to represent instructions for the user device in computer readable format. These instructions (which represent a filtered transcription) may then be transmitted back to the user device to be acted on by the user device.

It will be appreciated that language varies widely among different cultures, demographics, and geographic locales. Various filters and finite grammars may be selectively utilized, or not, depending on these, and other, factors. For example, if a user is associated with the United States, either through his or her user preferences or a GPS determination (as described hereinabove), or otherwise, then the word "period" may be abbreviated "." by an SMS filter. If a user is associated with the United Kingdom, however, then the word "full stop" may be abbreviated "." by an SMS filter. Further, it is contemplated that when transmitting messages from one user to another across locales, one or more filters may alter the message based on these locales. For example, a user in North Carolina may utter "I want a soda" and indicate that the phrase is to be sent to a second user in Michigan. The utterance may be stored as recorded audio data, and then transcribed in a backend server to "i want a soda". A locale filter may then be applied that would replace the word "soda", which is widely used in North Carolina, with the word "pop" which is widely used in Michigan. Applying this locale filter to the unfiltered transcription "i want a soda" would produce the filtered transcription "i want a pop". Preferably, one or more finite grammar filters are applied as well.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method, the computer-implemented method comprising:
under control of one or more computing devices configured with specific computer-executable instructions,
obtaining audio data comprising speech from a first device;
transcribing the speech using an automatic speech recognition engine having a statistical language model to generate a transcription comprising one or more words;
determining a characteristic related to the audio data, wherein the characteristic is not determined from the one or more words of the transcription;
selecting a filter for the transcription, wherein the filter is selected based at least in part on the characteristic; and
applying the selected filter to the transcription to generate a filtered transcription.

2. The computer-implemented method of claim 1 further comprising determining a location of the first device, and wherein the characteristic related to the audio data comprises the location of the first device.

3. The computer-implemented method of claim 1, wherein the audio data comprises a message from the first device to a second device.

4. The computer-implemented method of claim 3 further comprising determining a location of the second device, and wherein the characteristic related to the audio data comprises the location of the second device.

5. The computer-implemented method of claim 4, wherein the selected filter comprises a locale filter associated with the location of the second device.

6. The computer-implemented method of claim 3 further comprising providing the filtered transcription to the second device.

7. The computer-implemented method of claim 1, wherein determining the characteristic related to the audio data comprises receiving a selection of the characteristic from the first device.

8. A system comprising:
an electronic data store configured to store:
a statistical language model; and
one or more filters; and
a computing device in communication with the electronic data store, the computing device being configured to:
obtain audio data from a first device;
perform automatic speech recognition on the audio data with the statistical language model to generate speech recognition results;
determine a first characteristic associated with at least one of the audio data or the speech recognition results;
select a first filter based at least in part on the first characteristic; and
apply the first filter to the speech recognition results to produce first filtered speech recognition results.

9. The system of claim 8, wherein:
the computing device is configured to determine a name of a user of the first device;
the first characteristic comprises the name of the user of the first device; and
the first filter comprises a name filter corresponding to the name of the user of the first device.

10. The system of claim 8, wherein at least one of the audio data or the speech recognition results comprises a message from the first device to a second device.

11. The system of claim 10, wherein:
the computing device is configured to determine a type of a user of the second device;
the first characteristic comprises the type of the user of the second device; and
the first filter comprises a type filter corresponding to the type of the user of the first device.

12. The system of claim 10, wherein:
the computing device is further configured to determine a type of the message; and
the first characteristic comprises the type of the message.

13. The system of claim 12, wherein the type of the message comprises at least one of a text message, an email message, an instant message, or a voicemail.

14. The system of claim 12, wherein the computing device is configured to determine the type of the message by receiving an indication of the type of the message from the first device.

15. The system of claim 10, wherein the computing device is further configured to transmit the message to the second device.

16. The system of claim 15, wherein:
the first filter comprises a screening filter associated with a screening word;
the computing device is further configured to determine that the message includes the screening word; and
the computing device only transmits the message to the second device if the message includes the screening word.

17. The system of claim 15, wherein:
the first filter comprises a screening filter associated with a screening word;
the computing device is further configured to determine that the message does not include the screening word; and
the computing device only transmits the message to the second device if the message does not include the screening word.

18. The system of claim 15, wherein:
the first filter comprises a priority filter associated with a priority word;
the computing device is further configured to determine that the message includes the priority word; and
the computing device is further configured to transmit an indicator of high priority to the second device with the message.

19. A non-transitory computer-readable medium having stored thereon a computer-executable module configured to execute in one or more processors, the computer-executable module being further configured to:
receive, from a first device, audio data comprising speech of a user;
perform automatic speech recognition on the audio data with a statistical language model to generate speech recognition results;
select a first filter based at least in part on a first characteristic, wherein the first characteristic is not determined from the speech recognition results; and
apply the first filter to the speech recognition results to generate first filtered speech recognition results.

20. The non-transitory computer-readable medium of claim 19, wherein the computer-executable component is further configured to determine a designation of the first device, and wherein:
the first characteristic comprises the designation of the first device; and the first filter comprises a designation filter corresponding to the designation of the first device.

21. The non-transitory computer-readable medium of claim 20, wherein the designation of the first device comprises a phone number of the first device.

22. The non-transitory computer-readable medium of claim 19, wherein the computer-executable component is further configured to:
   select a second filter based at least in part on a second characteristic; and
   apply the second filter to the first filtered speech recognition results to generate second filtered speech recognition results.

23. The non-transitory computer-readable medium of claim 19, wherein:
   the audio data comprises a message from the first device to a second device; and
   the first characteristic corresponds to at least one of a type of the message, a user of the second device, or a type of the user of the second device.

24. The non-transitory computer-readable medium of claim 19, wherein the first filter comprises a finite grammar.

* * * * *